US012794626B2

(12) United States Patent
Shin et al.

(10) Patent No.: US 12,794,626 B2
(45) Date of Patent: Nov. 10, 2026

(54) METHOD AND APPARATUS FOR CHANNEL ESTIMATION IN COMMUNICATION SYSTEM

(71) Applicant: ELECTRONICS AND TELECOMMUNICATIONS RESEARCH INSTITUTE, Daejeon (KR)

(72) Inventors: Woo Ram Shin, Daejeon (KR); Kyeong Pyo Kim, Daejeon (KR); Young Jo Ko, Daejeon (KR); Kap Seok Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 369 days.

(21) Appl. No.: 18/398,958

(22) Filed: Dec. 28, 2023

(65) Prior Publication Data

US 2024/0243870 A1 Jul. 18, 2024

(30) Foreign Application Priority Data

Dec. 29, 2022 (KR) ........................ 10-2022-0189793

(51) Int. Cl.
*H04L 5/00* (2006.01)
*H04L 25/02* (2006.01)

(52) U.S. Cl.
CPC .......... *H04L 5/005* (2013.01); *H04L 25/0224* (2013.01)

(58) Field of Classification Search
CPC ... H04L 5/005; H04L 25/0224; H04L 5/0048; H04L 5/0051; H04W 72/231; H04W 72/232
See application file for complete search history.

(56) References Cited

U.S. PATENT DOCUMENTS

| | | | | |
|---|---|---|---|---|
| 7,990,841 | B2 | 8/2011 | Walton et al. | |
| 10,055,807 | B2 | 8/2018 | Lee et al. | |
| 11,456,908 | B2 | 9/2022 | Rakib et al. | |
| 2018/0324005 | A1* | 11/2018 | Kim .................... | H04L 27/2035 |
| 2018/0359014 | A1 | 12/2018 | Noh et al. | |
| 2019/0132172 | A1 | 5/2019 | Saito et al. | |
| 2022/0182271 | A1 | 6/2022 | Shin et al. | |

(Continued)

FOREIGN PATENT DOCUMENTS

| | | | | |
|---|---|---|---|---|
| CN | 111344984 A * | 6/2020 | ............ | H04W 72/23 |
| EP | 3258730 A1 * | 12/2017 | ............ | H04W 72/23 |

(Continued)

OTHER PUBLICATIONS

3GPP (3GPP TS 32.211 V17.3.0 Sep. 2022; hereinafter 3GPP211) (Year: 2022).*

(Continued)

*Primary Examiner* — Michael A Keller
(74) *Attorney, Agent, or Firm* — Rabin & Berdo, PC.

(57) ABSTRACT

A method of a terminal, for channel estimation in a communication system, may comprise: receiving configuration information of a block reference signal from a base station; receiving a modulated data channel including the block reference signal according to the configuration information; and demodulating the block reference signal in the received data channel to estimate a channel for resources in a two-dimensional domain, to which the block reference signal is allocated.

19 Claims, 11 Drawing Sheets

100

(56) References Cited

U.S. PATENT DOCUMENTS

| | | | |
|---|---|---|---|
| 2022/0272529 | A1 | 8/2022 | Hwang |
| 2023/0045595 | A1 | 2/2023 | Hebron et al. |
| 2023/0089222 | A1 | 3/2023 | Maki et al. |
| 2023/0199533 | A1 | 6/2023 | Shin et al. |

FOREIGN PATENT DOCUMENTS

| | | | | | |
|---|---|---|---|---|---|
| KR | 20170053338 | A | | 5/2017 | |
| KR | 20220081314 | A | | 6/2022 | |
| WO | WO-2016125223 | A1 | * | 8/2016 | ........... H04L 5/0048 |
| WO | 2018/191309 | A1 | | 10/2018 | |

OTHER PUBLICATIONS

R. Hadani et al., "Orthogonal Time Frequency Space Modulation", 2017 IEEE Wireless Communications and Networking Conference (WCNC), Mar. 19-22, 2017.

* cited by examiner

100

METHOD AND APPARATUS FOR CHANNEL ESTIMATION IN COMMUNICATION SYSTEM

CROSS-REFERENCE TO RELATED APPLICATIONS

This application claims priority to Korean Patent Application No. 10-2022-0189793, filed on Dec. 29, 2022, with the Korean Intellectual Property Office (KIPO), the entire contents of which are hereby incorporated by reference.

BACKGROUND

1. Technical Field

The present disclosure relates to a channel estimation technique in a communication system, and more specifically, to a channel estimation technique in a communication system, which considers channel variation between different resources.

2. Related Art

With the development of information and communication technology, various wireless communication technologies have been developed. Typical wireless communication technologies include Long Term Evolution (LTE) and New Radio (NR), which are defined in the 3rd Generation Partnership Project (3GPP) standards. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., New Radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, in 6G communication, which is currently being discussed, requirements of mobility support may increase up to 1000 km/h. In order to overcome the vulnerability to Doppler shifts of the existing orthogonal frequency division multiplexing (OFDM) modulation scheme, an orthogonal time frequency space (OTFS) modulation scheme in which a signal is transmitted by applying spreading in the time and frequency domain has been proposed as a candidate technology for a new waveform. In the OTFS modulation, a communication system can allocate at least reference signals to delay-Doppler resources for channel equalization. The reference signals allocated to different input delay resources on the same input Doppler resource may experience different channels due to Doppler effects. The larger the Doppler frequency, the greater the difference in experiences. The existing communication systems have used channel estimation techniques and reference signals that do not consider such difference in channels. As the Doppler frequency (or a coherence time compared to a symbol length of a multi-subcarrier symbol) increases relative to a subcarrier spacing, the difference in experiences may become more pronounced, and channel estimation performance degradation may increase, leading to deterioration in reception performance.

SUMMARY

Exemplary embodiments of the present disclosure are directed to providing a method and an apparatus for channel estimation in a communication system, which consider a change in channels for different input delay resources.

According to a first exemplary embodiment of the present disclosure, a method of a terminal may comprise: receiving configuration information of a block reference signal from a base station; receiving a modulated data channel including the block reference signal according to the configuration information; and demodulating the block reference signal in the received data channel to estimate a channel for resources in a two-dimensional domain, to which the block reference signal is allocated.

The block reference signal may include a first reference signal at a first power level, which is allocated to at least one resource of a reference signal block configured in the two-dimensional domain, and second reference signals at a second power level, which are allocated to remaining resources of the reference signal block, and the first power level may be greater than the second power level.

The first power level may be a boosting level that is not zero compared to a power allocated to data symbols in a data symbol region of the two-dimensional domain, and the second power level may be a boosting level that is zero compared to the power allocated to the data symbols in the data symbol region of the two-dimensional domain.

The configuration information of the block reference signal may include at least one of information on a size of a reference signal block in the two-dimensional domain to which the block reference signal is allocated, information on a region to which the reference signal block is allocated, information on a location of a first reference resource to which the first reference signal at the first power level is allocated in the reference signal block, information on generation of the first reference signal, or information on the first power level.

The information on the region to which the reference signal block is allocated may include at least one of information on a location of a first reference resource of the reference signal block and a size of the reference signal block, or information on the location of the first reference resource and a location of a second reference resource of the reference signal block.

The information on the location of the first reference resource to which the first reference signal is allocated may be configured as information on a first domain resource offset and a second domain resource offset of the first reference resource in the two-dimensional domain, or information on a first domain resource index and a second domain resource index of the first reference resource in the two-dimensional domain.

The configuration information of the block reference signal may be received from the base station through at least one of radio resource control (RRC), medium access control (MAC) control element (CE), or downlink control information (DCI) signaling.

The block reference signal may include a first reference signal at a first power level, which is allocated to at least one resource of each of a plurality of reference signal blocks configured in the two-dimensional domain, and second reference signals at a second power level, which are allocated to remaining resources of the each of the plurality of reference signal blocks, and the first power level may be greater than the second power level.

The plurality of reference signal blocks may not overlap each other.

The demodulating of the block reference signal in the received data channel to estimate the channel for resources in the two-dimensional domain to which the block reference signal is allocated may comprise: demodulating the block reference signal in the received data channel to estimate a channel for a first reference resource of the block reference signal in the two-dimensional domain, to which a first reference signal at a first power level is allocated; and estimating or recovering channels for remaining resources in the two-dimensional domain by using a channel estimation result for the first reference resource in the two-dimensional domain, wherein resources in the two-dimensional domain, to which the block reference signal is allocated, include the first reference resource in the two-dimensional domain and a second reference resource in the two-dimensional domain, to which a second reference signal at a second power level is allocated, and the first power level is greater than the second power level.

The configuration information of the block reference signal may include information on a channel estimation region in the resources to which the block reference signal is allocated, and the demodulating of the block reference signal in the received data channel to estimate the channel for resources in the two-dimensional domain to which the block reference signal is allocated may comprise: demodulating the block reference signal in the received data channel to estimate a channel for resources in the channel estimation region, which include a first reference signal of the block reference signal at a first power level; and estimating or recovering channels for remaining resources excluding the first reference resource in the two-dimensional domain by using a channel estimation result for the resources in the channel estimation region, wherein the channel estimation region includes a first reference resource in the two-dimensional domain and a part of second reference resources in the two-dimensional domain, to which a second reference signal of the block reference signal at a second power level is allocated, and the first power level is greater than the second power level.

The method may further comprise: estimating a channel for a data symbol region using channel estimation for the resources to which the block reference signal is allocated; and detecting data in the data channel using the channel estimated for the data symbol region.

According to a second exemplary embodiment of the present disclosure, a method of a base station may comprise: transmitting configuration information of a block reference signal to a terminal; and transmitting a modulated data channel including the block reference signal according to the configuration information to the terminal.

The configuration information of the block reference signal may be transmitted to the terminal through at least one of radio resource control (RRC), medium access control (MAC) control element (CE), or downlink control information (DCI) signaling.

The block reference signal may include a first reference signal at a first power level, which is allocated to at least one resource of a reference signal block configured in the two-dimensional domain, and second reference signals at a second power level, which are allocated to remaining resources of the reference signal block, and the first power level may be greater than the second power level.

The configuration information of the block reference signal may include at least one of information on a size of a reference signal block in the two-dimensional domain to which the block reference signal is allocated, information on a region to which the reference signal block is allocated, information on a location of a first reference resource to which the first reference signal at the first power level is allocated in the reference signal block, information on generation of the first reference signal, or information on the first power level.

According to a third exemplary embodiment of the present disclosure, a terminal may comprise a processor, and the processor may cause the terminal to perform: receiving configuration information of a block reference signal from a base station; receiving a modulated data channel including the block reference signal according to the configuration information; and demodulating the block reference signal in the received data channel to estimate a channel for resources in a two-dimensional domain, to which the block reference signal is allocated.

The block reference signal may include a first reference signal at a first power level, which is allocated to at least one resource of a reference signal block configured in the two-dimensional domain, and second reference signals at a second power level, which are allocated to remaining resources of the reference signal block, and the first power level may be greater than the second power level.

In the demodulating of the block reference signal in the received data channel to estimate the channel for resources in the two-dimensional domain to which the block reference signal is allocated, the processor may further cause the terminal to perform: demodulating the block reference signal in the received data channel to estimate a channel for a first reference resource of the block reference signal in the two-dimensional domain, to which a first reference signal at a first power level is allocated; and estimating or recovering channels for remaining resources in the two-dimensional domain by using a channel estimation result for the first reference resource in the two-dimensional domain, wherein resources in the two-dimensional domain, to which the block reference signal is allocated, include the first reference resource in the two-dimensional domain and a second reference resource in the two-dimensional domain, to which a second reference signal at a second power level is allocated, and the first power level is greater than the second power level.

The processor may further cause the terminal to perform: estimating a channel for a data symbol region using channel estimation for the resources to which the block reference signal is allocated; and detecting data in the data channel using the channel estimated for the data symbol region.

According to the present disclosure, a communication system can configure a delay-Doppler domain reference signal considering a change in a channel for different input delay resources, and use the delay-Doppler domain reference signal to estimate a channel in the delay-Doppler domain. In addition, according to the present disclosure, the estimated delay-Doppler domain channel can improve the estimation accuracy of the channel that varies across input delay resources. Further, according to the present disclosure, channel equalization performance can be improved, ultimately leading to improvement of reception performance (e.g., block error rate (BLER), bit error rate (BER), throughput, frequency efficiency, transmission speed, and the like).

DETAILED DESCRIPTION OF THE EMBODIMENTS

Figure 1:
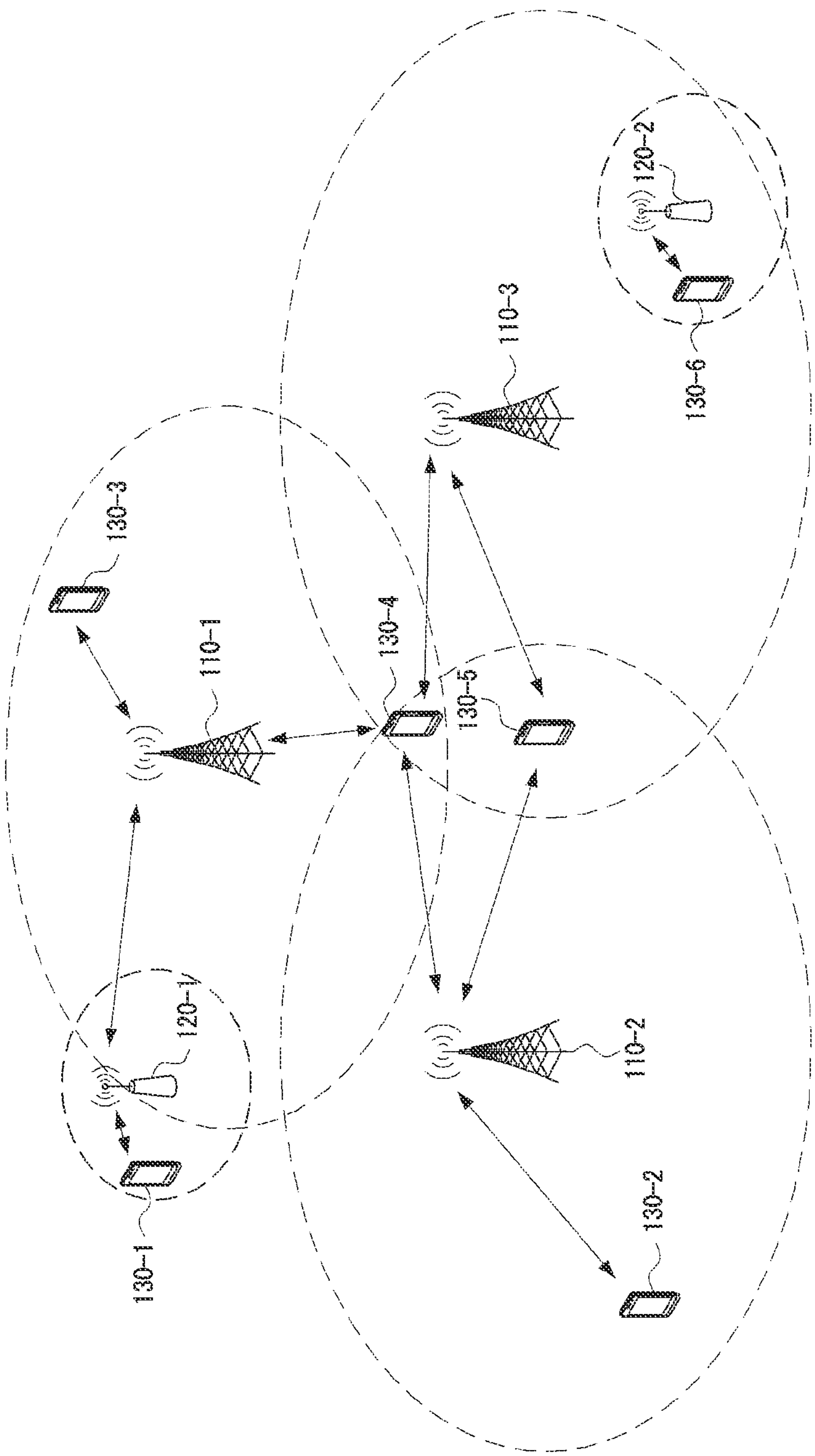
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, orthogonal frequency division multiple access (OFDMA) based communication protocol, single-carrier FDMA (SC-FDMA) based communication protocol, non-orthogonal multiple access (NOMA) based communication protocol, space division multiple access (SDMA) based communication protocol, or the like. Each of the plurality of communication nodes may have the following structure.

Figure 2:
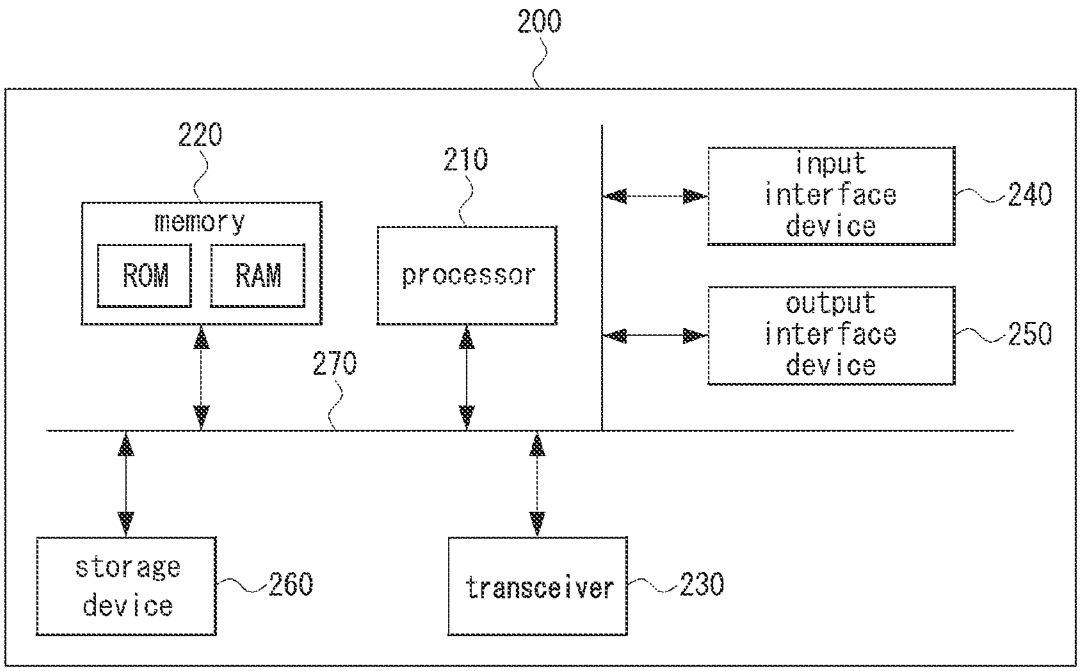
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), base transceiver station (BTS), radio base station, radio transceiver, access point (AP), access node, road side unit (RSU), digital unit (DU), cloud digital unit (CDU), radio remote head (RRH), radio unit (RU), transmission point (TP), transmission and reception point (TRP), relay node, or the like. Each of the plurality of terminals 130-1, 130-2, 130-3, 130-4, 130-5, and 130-6 may be referred to as terminal, access terminal, mobile terminal, station, subscriber station, mobile station, portable subscriber station, node, device, or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), New Radio (NR), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Meanwhile, in 6G communication, which is currently being discussed, requirements of mobility support may increase up to 1000 km/h. In order to overcome the vulnerability to Doppler shifts of the existing orthogonal frequency division multiplexing (OFDM) modulation scheme, an orthogonal time frequency space (OTFS) modulation scheme in which a signal is transmitted by applying spreading in the time and frequency domain has been proposed as a candidate technology for a new waveform.

A transmitter using the OTFS modulation scheme may map data symbols in the delay-Doppler domain, and spread the data symbols to resources in the time-frequency domain. Here, spreading may refer to a process of preprocessing signals and mapping the preprocessed signals to resources in the time-frequency domain.

For the spread data symbols, the transmitter may perform multi-carrier modulation (e.g., OFDM modulation) for each multi-carrier (MC) symbol. Then, the transmitter may convert the multi-carrier modulated signal into an analog signal through a digital-to-analog converter (DAC). The transmitter may generate an RF analog signal through a transmitter-side radio frequency (RF) front-end (RFFE), and transmit the RF analog signal through antenna(s). The DAC and the transmitter-side RFFE may be collectively referred to as a transmitter-side transceiver unit, and may be abbreviated as a transmitter-side TXRU.

Meanwhile, a receiver may receive the RF analog signal from the transmitter through antenna(s). The receiver may pass the received RF analog signal through a receiver-side RFFE, and then convert the received RF analog signal into a digital signal through an analog-to-digital converter (ADC). The receiver may perform a demodulation process on the digital signal in the digital baseband. The ADC and the receiver-side RFFE may be collectively referred to as a receiver-side TXRU.

In the digital baseband demodulation process, the receiver may perform multi-carrier demodulation (e.g., OFDM demodulation) for MC symbols, and then de-map the MC symbols from resources in the time-frequency domain. Then, the receiver may de-spread the de-mapped symbols into the delay-Doppler domain through post-processing. Then, the receiver may perform de-mapping from resources in the delay-Doppler domain. The receiver may detect data symbols (or bits constituting the data symbols) by performing delay-Doppler domain channel estimation and channel equalization based on a channel estimate with respect to the de-mapped data symbols.

An encoding system of the receiver may obtain log-likelihood ratio (LLR) values for the encoded bits through the data symbol de-mapping process, and obtain information (or message) bits through a channel decoding process. The receiver may perform the channel equalization before delay-Doppler domain de-mapping, or before or after time-frequency domain de-mapping.

In addition to OTFS, the present disclosure may also consider a modulation scheme that spreads data to each of a plurality of spreading resource groups (or blocks) composed of a plurality of different resources in the time-frequency domain. Hereinafter, such modulation scheme may be collectively referred to as a multi-block spread multi-carrier (MBS-MC) modulation scheme. Meanwhile, the OTFS modulation scheme may have a single resource grid in the delay-Doppler domain. In addition, the MBS-MC modulation scheme may define an independent delay-Doppler domain resource grid for each spreading resource group for spreading to different resource(s) in the time-frequency domain. The resource grid may refer to a multi-dimensional resource structure composed of one or more resources (or resource elements). For example, the resource grid in the delay-Doppler domain may refer to a structure in which resource elements are arranged in two dimensions on the delay axis and the Doppler axis.

Here, a delay-Doppler resource may refer to a resource belonging to the delay-Doppler domain. A Doppler (or delay) resource may refer to a resource belonging to the Doppler (or delay) domain. A delay-Doppler resource may be indicated by a delay-Doppler resource index. The delay-Doppler resource may be expressed in one dimension. Alternatively, the delay-Doppler resource may be expressed in two dimensions by using a delay resource index and a Doppler resource index. The 'delay-Doppler resource' may be replaced by a term 'Doppler-delay resource', and the 'delay-Doppler domain' may be replaced by a term 'Doppler-delay domain'. However, hereinafter, they are described based on the terms 'delay-Doppler resource' and 'delay-Doppler region', respectively. Each column of an effective channel matrix in the delay-Doppler domain, which will be described later, may correspond to each input delay-Doppler resource, and each row thereof may correspond to each output delay-Doppler resource.

A time-frequency resource may refer to a resource belonging to the time-frequency domain. A time (or frequency) resource may refer to a resource belonging to the time (or frequency) domain. A time-frequency resource may be indicated by a time-frequency resource index. The time-frequency resource may be expressed in one dimension, or may be expressed in two dimensions by using a time resource index and a frequency resource index. The 'time-frequency resource' may be replaced by a term 'frequency-time resource', and the 'time-frequency domain' may be replaced by a term 'frequency-time domain'. However, hereinafter, they are described based on the terms 'time-frequency resource' and 'time-frequency domain', respectively.

The delay-Doppler domain has duality with the time-frequency domain in signal analysis. In order to prevent the ideas and techniques of the present disclosure from being interpreted as limited due to the use of specific terms such as delay-Doppler domain and time-frequency domain and thus preventing evasion of the ideas and techniques of the present disclosure, the delay-Doppler domain may be generalized to a first two-dimensional domain, and the time-frequency domain may be generalized to a second two-dimensional domain. Accordingly, the delay-Doppler domain described later may be replaced with the first two-dimensional domain, and a delay-Doppler resource may be replaced with a first two-dimensional resource. In addition, the delay resource and Doppler resource may be replaced with a first resource in the first two-dimensional domain and a second resource in the first two-dimensional domain, respectively. Further, the time-frequency domain described later may be replaced with the second two-dimensional domain, and the time-frequency resource may be replaced with a second two-dimensional resource. Further, the time resource and the Doppler resource may be replaced with a first resource in the second two-dimensional domain and a second resource in the second two-dimensional domain, respectively.

In a modulation scheme that spreads each data symbol mapped to each delay-Doppler resource to time-frequency resources, such as the OTFS modulation scheme or MBS-MC modulation scheme, the communication system may allocate at least a reference signal for channel equalization (hereinafter collectively referred to as 'reference signal') to delay-Doppler resource(s). The reference signal may have a block structure comprising non-zero signal(s) at the center of the delay-Doppler resources allocated for this purpose and zero signals at the resources surrounding the non-zero signal(s).

In the OTFS modulation scheme or MBS-MC modulation scheme, signals allocated to different input delay resources on the same input Doppler resource may experience different channels by Doppler effects. The higher the Doppler frequency, the greater the difference in experiences. The existing communication systems have used channel estimation techniques and reference signals that do not consider such difference in channels. As the Doppler frequency (or a coherence time compared to a symbol length of a multi-subcarrier symbol) increases relative to a subcarrier spacing, the difference in experiences may become more pronounced, and channel estimation performance degradation may increase, leading to deterioration in reception performance. The present disclosure provides a channel estimation method that considers a change in channels for different input delay resources and a configuration method of a reference signal required for the same.

The present disclosure describes a method for estimating a delay-Doppler domain channel and a reference signal used therefore. First, the present disclosure describes a modulation scheme and a demodulation scheme to which they are applicable. Further, the present disclosure makes description based on OTFS, which performs spreading across all resources in the time-frequency domain, as an example of modulation. Meanwhile, the channel estimation method described below and the reference signal transmission used therefore may be identically or similarly applied to the form (e.g., MBS-MC) of spreading to some resources in the time-frequency domain. For example, for each delay-Doppler resource grid corresponding to each spreading resource group (or block), the channel estimation method applied to OTFS, which can be considered to have a single delay-Doppler resource grid, and the reference signal transmission used therefore may be applied identically or similarly to the MBS-MC.

Figure 3:
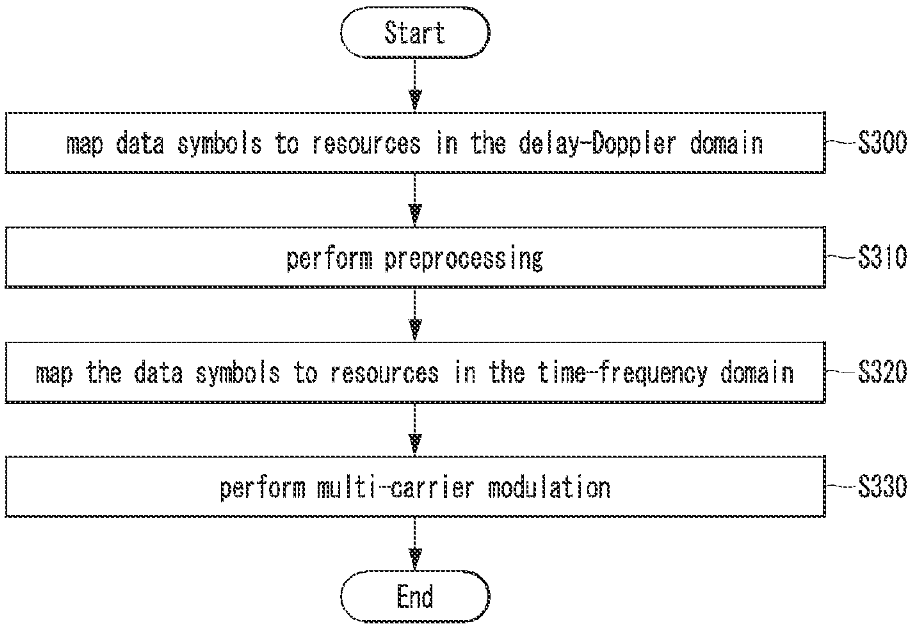
FIG. 3 is a flowchart illustrating a first exemplary embodiment of an orthogonal time frequency space (OTFS) modulation method.

FIG. 3 is a flowchart illustrating a first exemplary embodiment of an orthogonal time frequency space (OTFS) modulation method.

Referring to FIG. 3, a transmitter may map data symbols (i.e., data symbols constituting a codeword) to resources in the delay-Doppler domain (S300). The transmitter may preprocess the data symbols (S310) and map the preprocessed data symbols to resources in the time-frequency domain (S320). In the above-described manner, the transmitter may spread the data symbols to resources in the time-frequency domain. The spreading may refer to a process of preprocessing data symbols and mapping the preprocessed data symbols to resources in the time-frequency domain. For these spread data symbols, the transmitter may perform multi-carrier modulation (e.g., OFDM modulation) for each multi-carrier symbol (S330). Meanwhile, the transmitter may spread each data symbol over some resources in the time-frequency domain.

The transmitter may pass the modulated signal output through the modulation process to a transmitter-side TXRU and transmit the converted RF analog signal through antenna(s).

In the above-described OTFS transmission process, when spread to all resources in the time-frequency domain, a digital baseband transmission signal input to the TXRU may be expressed as Equation 1 below.

$$S = C_I F_M^H F_M X F_N^H = C_I X F_N^H \quad \text{[Equation 1]}$$

Here, S may be an OTFS modulated symbol matrix with a size of $\overline{M}$×N. X may be a data symbol matrix of size M×N for the codeword. $F_K$ may be a K-point discrete Fourier transform matrix. $C_I$ may be a cyclic prefix (CP) insertion matrix with a CP length of $M_{CP}$. $\overline{M}$ may be M+$M_{CP}$, which is the length of a multi-carrier symbol, expressed as the number of time samples, and may be a real number. M may be the number of carriers or delays in a time-frequency resource or a delay-Doppler resource and may be a real number. $M_{CP}$ may be the CP length, which is expressed as the number of time samples, and may be a real number. N may be the number of multi-carrier symbols or Doppler shifts in a time-frequency resource or delay-Doppler resource and may be a real number. $(\cdot)^H$ means a complex conjugate transpose of a given matrix.

Here, each column of S is a transmission signal belonging to each MC symbol, and when S is vectorized, Equation 2 may be obtained. Here, $(\cdot)^H$ means a transpose of an input matrix. ⊗ means a Kronecker product operator.

$$s = vec(S) = \left(F_N^H \otimes C_I\right) vec(X) = \left(F_N^H \otimes C_I\right) x \quad \text{[Equation 2]}$$

Here, vec(S) may be equal to Equation 3 below.

$$vec(S) = vec([s_1 \ \ s_2 \ \ \ldots \ \ s_N]) = \left[s_1^T \ \ s_2^T \ \ \ldots \ \ s_N^T\right]^T \quad \text{[Equation 3]}$$

Meanwhile, the transmission signal may undergo a multipath channel. In this case, a reception signal received by a receiver from the transmitter may be expressed as Equation 4 below. Here, r may be a reception signal vector of a reception signal received during a transmission time interval. H may be a channel impulse response matrix during the transmission time interval. n may be a Gaussian noise vector.

$$r = Hs + n \quad \text{[Equation 4]}$$

In Equation 4, the channel response matrix may be given as a sum of channel responses each configured through each channel path, as in Equation 5.

$$H = \sum_{p \in [P]^+} \eta_p \cdot \prod\nolimits_{\overline{M}N, L_{CH}+1}^{\tau_p} \cdot \Delta_{\overline{M}N}^{\nu_p} \quad \text{[Equation 5]}$$

P may be the number of channel paths. $[K]^+$ may be defined as $[K]^+=\{1,2, \ldots, K\}$ for K, a positive integer. $\eta_p$ may be a channel coefficient of the p-th channel path. $\Pi_{L,\overline{L}}$ may be expressed as Equation 6 and may be a non-circular row-wise shift (or time translation) matrix with a size of (L+$\overline{L}$−1)×L.

$$\prod\nolimits_{L,\overline{L}} := \left(\begin{bmatrix} 0 & 0 & \ldots & 0 \\ 1 & 0 & \ddots & 0 \\ 0 & \ddots & \ddots & \vdots \\ 0 & 0 & 1 & 0 \end{bmatrix}\right) \quad \text{[Equation 6]}$$

$\Delta_L$ may be a diagonal matrix diag($\zeta^0, \zeta^1, \ldots, \zeta^{L-1}$) with a size of L×L, where ζ is defined as ζ:=exp(ι2π/L), and may be a frequency modulation matrix. $\tau_p$ may be a delay normalized by a delay interval in the delay-Doppler domain, and may be expressed as Equation 7 below. Here, $\overline{\tau}_p$ may be a delay of the p-th channel path in the time domain. Δf may be a subcarrier spacing. $l_p$ may be an integer part of the nearest delay sample $\tau_p$ in the delay-Doppler domain. $\iota_p$ may be a fractional part of the nearest delay sample $\tau_p$ in the delay-Doppler domain.

$$\tau_p = \overline{\tau}_p M \Delta f = l_p + \iota_p \quad \text{[Equation 7]}$$

Meanwhile, $v_p$ may be equal to Equation 8 below, and may be a Doppler shift normalized by a Doppler interval in the delay-Doppler domain. $\overline{v}_p$ may be a Doppler shift of the p-th channel path in the frequency domain. T may be an MC symbol period. $k_p$ may be an integer part of the nearest Doppler sample in the Doppler-delay domain. $\kappa_p$ may be a fractional part of the nearest Doppler sample in the Doppler-delay domain. $L_{CH}$ may be the maximum channel length in time samples and may be a positive real number.

$$v_p = \overline{v}_p NT = k_p + \kappa_p \quad \text{[Equation 8]}$$

Referring to Equation 5, it can be seen that the channel response matrix is composed of three elements for each channel path: delay (or time shift), Doppler shift, and channel coefficient.

The receiver may receive an RF analog signal from the transmitter through antenna(s). The receiver may obtain a digital baseband signal by passing the received RF analog signal through a receiver-side RFFE and converting it into a digital signal. Then, the receiver may perform a demodulation process on the digital baseband signal.

Figure 4:
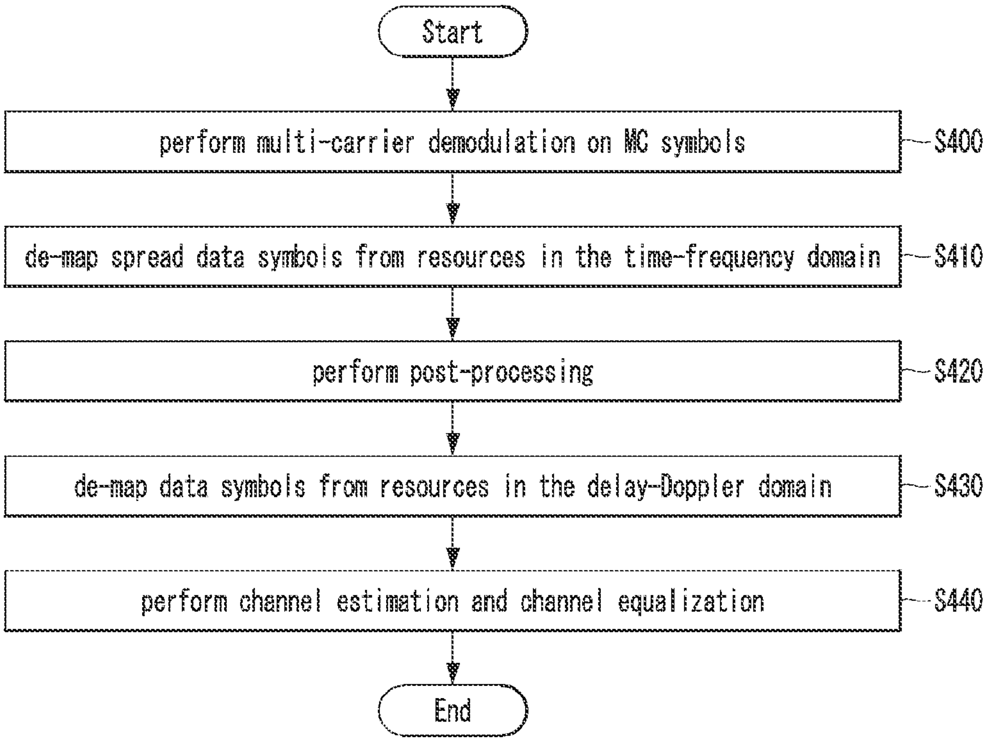
FIG. 4 is a flowchart illustrating a first exemplary embodiment of an OTFS demodulation method.

FIG. 4 is a flowchart illustrating a first exemplary embodiment of an OTFS demodulation method.

Referring to FIG. 4, a receiver may perform multi-carrier demodulation on multi-carrier symbols (S400). The receiver may de-map (spread) data symbols from resources in the time-frequency domain (S410). Then, the receiver may de-spread the de-mapped data symbols into the delay-Doppler domain through post-processing (S420). Here, the de-spreading may mean a process of de-mapping the (spread) data symbols from resources in the time-frequency domain and performing post-processing on the de-mapped data symbols. Thereafter, the receiver may obtain de-mapped data symbols by performing de-mapping of data symbols de-spread from resources in the delay-Doppler domain (S430). Then, the receiver may detect data symbols (or bits constituting the data symbols) by performing delay-Doppler domain channel estimation and channel equalization based on the channel estimate for the de-mapped data symbols (S440).

In relation to this, a decoding system of the receiver may calculate LLR values for the encoded bits through the data symbol de-mapping process and obtain information (or message) bits through a channel decoding process. Here, the channel equalization may be performed before delay-Doppler domain de-mapping, or before or after time-frequency domain de-mapping.

In the OTFS reception process, the receiver may perform de-spreading from all resources in the time-frequency domain. In this case, a signal obtained by performing the demodulation process on the digital baseband reception signal output from a TXRU of the receiver before delay-Doppler domain channel estimation and equalization may be expressed as a determinant as shown in Equation 9 below.

$$Y = F_M^H F_M C_R R F_N = C_R R F_N \quad \text{[Equation 9]}$$

Here, Y may be a data symbol matrix demodulated from the reception signal matrix R. $C_R$ may be equal to $$C_I^T$$

and may be a CP removal matrix.

Here, each column of Y may be a demodulated data symbol vector belonging to each Doppler resource, and when Y is vectorized, it may be expressed as Equation 10.

$$\begin{aligned} y &= vec(Y) \quad \text{[Equation 10]} \\ &= (F_N \otimes C_R)vec(R) \\ &= (F_N \otimes C_R)r \\ &= (F_N \otimes C_R)(Hs + n) \end{aligned}$$

-continued $$\begin{aligned} &= (F_N \otimes C_R)\left(H\left(F_N^H \otimes C_I\right)x + n\right) \\ &= \overline{H}x + \overline{n} \end{aligned}$$

In Equation 10, $\overline{H}$ may be equal to Equation 11 below.

$$\begin{aligned} \overline{H} &= (F_N \otimes I_M)(I_N \otimes C_R)H(I_N \otimes C_I)\left(F_N^H \otimes I_M\right) \\ &= (F_N \otimes I_M)\left(\sum_{p \in [P]^+} \eta_p \cdot \underset{n \in [N]^+}{b\mathrm{diag}}\left(\Psi_n^{(p)}\right)\right)\left(F_N^H \otimes I_M\right) \end{aligned} \quad \text{[Equation 11]}$$

In Equation 11, $$\underset{n \in [N]^+}{bb\mathrm{diag}}\left(\Psi_n^{(p)}\right)$$

may be equal to Equation 12 below.

$$\underset{n \in [N]^+}{b\mathrm{diag}}\left(\Psi_n^{(p)}\right) = (I_N \otimes C_R)\prod\nolimits_{\overline{M}N}^{\tau_p} \Delta_{\overline{M}N}^{\nu_p}(I_N \otimes C_I) \quad \text{[Equation 12]}$$

In Equation 12, $$\Psi_n^{(p)}$$

may be equal to Equation 13 below.

$$\Psi_n^{(p)} = \overline{\prod}\nolimits_M^{\tau_p} \overline{\Delta}_{M,\overline{M}N,\overline{M}(n-1)}^{\nu_p} \quad \text{[Equation 13]}$$

In Equation 13, $\overline{\Pi}_L$ may be equal to Equation 14 below, and may be a circular row-wise shift (or time translation) matrix with a size of L×L.

$$\overline{\prod}_L := \begin{bmatrix} 0 & \cdots & 0 & 1 \\ 1 & 0 & \ddots & 0 \\ 0 & \ddots & \ddots & \vdots \\ 0 & 0 & 1 & 0 \end{bmatrix} \quad \text{[Equation 14]}$$

$\overline{\Delta}_{L,\overline{L},L}$ may be equal to Equation 15 below, and may be a frequency modulation matrix with an offset l and a diagonal matrix with a size of L×L, which has $\zeta = \exp(\imath 2\pi/\overline{L})$.

$$\overline{\Delta}_{L,\overline{L},l} := \mathrm{diag}\left(\overline{\zeta}^{l}, \overline{\zeta}^{l+1}, \ \ldots\ , \overline{\zeta}^{l+L-1}\right) \quad \text{[Equation 15]}$$

$$\underset{n \in [N]^+}{b\mathrm{diag}}(A_n)$$

may be expressed as Equation 16 below.

$$b\mathrm{diag}_{n\in[N]^+}(A_n) = \begin{bmatrix} A_1 & & & \\ & A_2 & & \\ & & \ddots & \\ & & & A_N \end{bmatrix} \quad \text{[Equation 16]}$$

$\bar{n}$ may be equal to Equation 17.

$$\bar{n} = (F_N \otimes C_R)n \quad \text{[Equation 17]}$$

Figure 5:
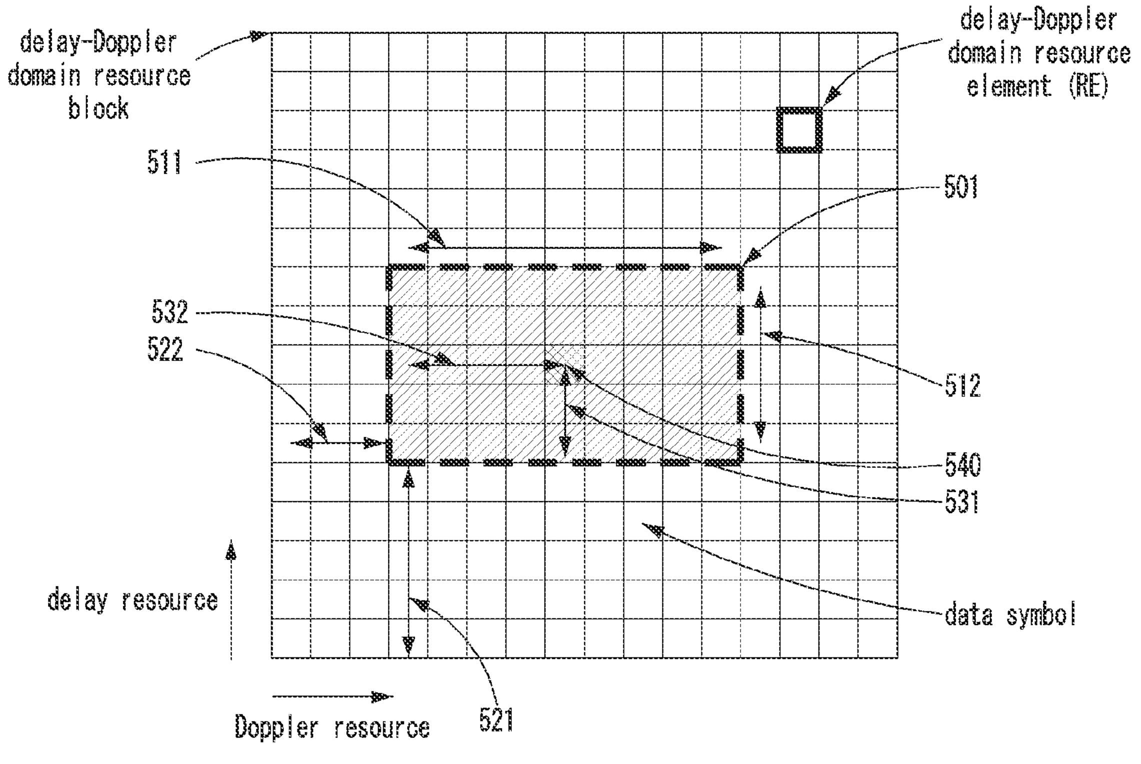
FIG. 5 is a conceptual diagram illustrating a first exemplary embodiment of a single block-based reference signal.

FIG. 5 is a conceptual diagram illustrating a first exemplary embodiment of a single block-based reference signal.

Referring to FIG. 5, a reference signal block 501 composed of one or more resource elements may be allocated in a delay-Doppler domain resource block (also referred to as a delay-Doppler resource block, a delay-Doppler domain resource grid, or a delay-Doppler resource grid) including one or more delay-Doppler domain resource elements (hereinafter, unless otherwise specified, the delay-Doppler domain resource element is simply referred to as a resource element). Here, the delay-Doppler domain resource element (RE) may be composed of one delay resource and one Doppler resource within the delay-Doppler resource grid. The reference signal block 501 may comprise a reference signal (or reference signals) of a first level, which is allocated to a first resource element having one resource element (or first resource element group comprising a plurality of resource elements, hereinafter, unless otherwise specified, referred to as 'first resource element'), and reference signals of a second level, which are allocated to the remaining resource elements. The first resource element may be a central resource element 540 in the reference signal block 501. The reference signal with the above-described structure may be referred to as a block reference signal. Alternatively, the reference signal with the above-described structure may be referred to as a single block reference signal. Data symbols may be allocated to the remaining resource elements excluding the reference signal block 501 within the delay-Doppler resource grid. When a plurality of resource grids are configured in the delay-Doppler domain as in the MBS-MC scheme, the above-described reference signal block may be allocated to each delay-Doppler resource grid.

The transmitter may configure the reference signal block 501, which may have a predetermined size, to resources in the delay-Doppler domain (or delay-Doppler resource grid). The size of the reference signal block 501 may be defined by a Doppler resource length 511 and a delay resource length 512. Here, the Doppler resource length 511 of the reference signal block 501 may be defined as the number of Doppler resources on the Doppler axis, and the delay resource length 512 of the reference signal block 501 may be defined as the number of delay resources on the delay axis.

The transmitter and receiver may define the size of the reference signal block 501 in advance and set it without separate signaling. Alternatively, the transmitter may select the size of the reference signal block 501 and set it to the receiver through signaling. Conversely, the receiver may select the size of the reference signal block 501 and set it to the transmitter through signaling. Parameter(s) for signaling the size of the reference signal block may be separately configured as the delay resource length and Doppler resource length of the reference signal block, or may be configured as a combination of the delay resource length and Doppler resource length of the reference signal block.

Meanwhile, the transmitter and receiver may predefine a location (or locations) of the reference signal block 501 within the delay-Doppler resource grid, and set it without separate signaling. Alternatively, the transmitter may select the location (or locations) of the reference signal block 501 within the delay-Doppler resource grid, and set it to the receiver through signaling. Conversely, the receiver may select the location (or locations) of the reference signal block 501 within the delay-Doppler resource grid, and set it to the transmitter through signaling.

Here, the location (or each of the locations) of the reference signal block 501 within the delay-Doppler resource grid may be indicated by a delay resource index and a Doppler resource index of the first resource element belonging to the reference signal block within the delay-Doppler resource grid. In addition, it may be indicated by a delay resource offset and a Doppler resource offset of the first resource element belonging to the reference signal block from a first reference resource element within the delay-Doppler resource grid. Here, the first reference resource element may be a resource element with the lowest delay index and the lowest Doppler index within the delay-Doppler resource grid. In addition, the location (or each of the locations) in the delay-Doppler resource grid may be defined between the transmitter and receiver for which resource element (or resource elements) is within the reference signal block 501.

For example, the location (or each of locations) within the delay-Doppler resource grid may be one of four vertices or a center point of the reference signal block. Each of the four vertices may be a resource element corresponding to the lowest delay resource index (or start delay resource offset 521) and the lowest Doppler resource index (or start Doppler resource offset 522) of the reference signal block, a resource element corresponding to the highest delay resource index (or end delay resource offset) and the highest Doppler resource index (or end Doppler resource offset) of the reference signal block, a resource element corresponding to the lowest delay resource index (or start delay resource offset) and the highest Doppler resource index (or end Doppler resource offset) of the reference signal block, or a resource element corresponding to the highest delay resource index (or end delay resource offset) and the lowest Doppler resource index (or start Doppler resource offset) of the reference signal block. The center point is a resource element located at the center of the reference signal block.

A region to which the reference signal block 501 is allocated within the delay-Doppler resource grid may be configured by a combination of a location within the delay-Doppler resource grid and the size of the reference signal block.

The region to which the reference signal block 501 is allocated within the delay-Doppler resource grid may be configured by a combination of a first location and a second location within the Doppler resource grid. An example of a combination of the first location and the second location may include a combination of a location indicated by the start delay resource offset and the start Doppler resource offset and a location indicated by the end delay resource offset and the end Doppler resource offset. Another example of a combination of the first location and the second location may include a combination of a location indicated by the start delay resource offset and the end Doppler resource offset and a location indicated by the end delay resource offset and the start Doppler resource offset.

Meanwhile, the transmitter may allocate a reference signal (or symbol) with a first level of power (or magnitude) to the first resource element 540 within the reference signal block 501, and allocate reference signals with a second level of power (or magnitude) to the remaining resources surrounding the first resource element. Here, the first level may be larger than the second level. As an example, the first level may have a non-zero power (or magnitude), and the second level may have a zero power (or magnitude). Here, a reference signal with non-zero power (or magnitude) may be referred to as a non-zero power reference signal.

In addition, a reference signal with zero power (or magnitude) may be referred to as a zero power reference signal. The transmitter and receiver may define the power (or magnitude) of the reference signal in advance and set it without separate signaling. Alternatively, the transmitter may select the power (or magnitude) of the reference signal and set it to the receiver through signaling. Conversely, the receiver may select the power (or magnitude) of the reference signal and set it to the transmitter through signaling.

For zero power reference signals, information related to power (or amplitude) configuration may be excluded from signaling parameters. The signaling parameters regarding the power (or magnitude) of the reference signal may indicate a value of the power itself or a boosting level (or relative ratio or relative difference) compared to a power allocated to data symbols.

The transmitter and receiver may predefine the reference signal itself (or symbol, or a sequence when the reference signal is configured with multiple symbols) or parameters related to its generation, and configure them without separate signaling. Alternatively, the transmitter may select the reference signal (or symbol, or a sequence when the reference signal is configured with multiple symbols) or parameters related to its generation, and configure them to the receiver through signaling. Conversely, the receiver may select the reference signal (or symbol, or a sequence when the reference signal is configured with multiple symbols) itself or parameters related to its generation, and configure them to the transmitter through signaling.

The location of the first level reference signal within the delay-Doppler resource grid (or, in case of reference signals allocated to the first resource element group, a location of a second reference element of the first resource element group within the delay-Doppler resource grid) may be indicated by a delay resource offset 531 and a Doppler resource offset 532 of a resource element (or, in case of reference signals allocated to the first resource element group, a second reference resource element in the first resource element group) to which the first level reference signal is allocated.

Here, the delay resource offset may be a difference in delay resources of the resource element to which the first level reference signal is allocated and a third reference resource element, and the Doppler resource offset may be a difference in Doppler resource of the resource element to which the first level reference signal is allocated and the third reference resource element. The third reference resource element may be one resource element in the reference signal block, and may be a resource element with the lowest delay resource index and the lowest Doppler resource index. In the latter case, the delay resource offset may correspond to a delay resource index defined within the reference signal block, and the Doppler resource offset may correspond to a Doppler resource index defined within the reference signal block. In case of reference signals allocated to the first resource element group, the region to which the reference signals are allocated may be indicated by the location of the first resource element group (or the location of the second reference resource element) and the size thereof. Here, the second reference resource element may be one resource element within the first resource element group, and may be a resource element located in the center within the first resource element group.

Figure 6:
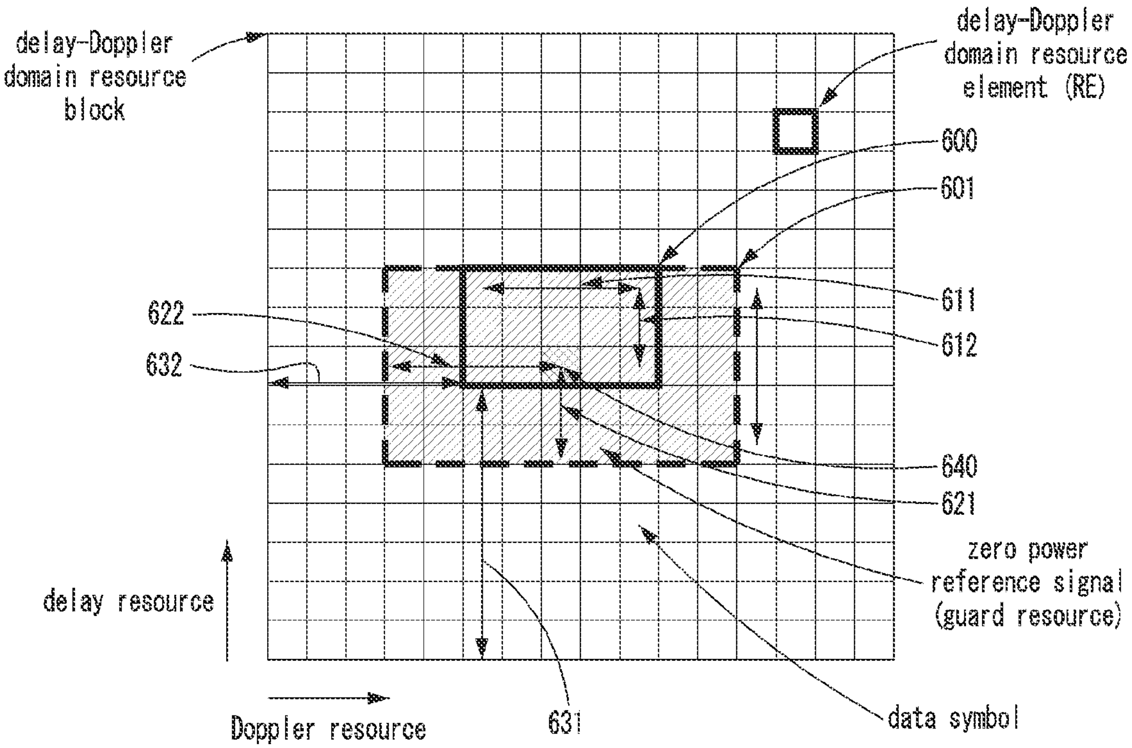
FIG. 6 is a conceptual diagram illustrating a first exemplary embodiment of a channel estimation target region.

FIG. 6 is a conceptual diagram illustrating a first exemplary embodiment of a channel estimation target region.

Referring to FIG. 6, a channel estimation target region 600 may be located within a reference signal block 601. The channel estimation target region 600 may have a block-shaped structure on a delay-Doppler resource grid. The size of the channel estimation target region 600 may be defined by a Doppler resource length 611 and a delay resource length 612. Here, the Doppler resource length 611 of the channel estimation target region 600 may be defined as the number of Doppler resources on the Doppler axis, and the delay resource length 612 of the channel estimation target region 600 may be defined as the number of delay resources on the delay axis.

The transmitter and receiver may predefine the size of the channel estimation target region 600 and set it without separate signaling. Alternatively, the transmitter may select the size of the channel estimation target region 600 and set it to the receiver through signaling. Conversely, the receiver may select the size of the channel estimation target region 600 and set it to the transmitter through signaling. Parameter(s) for signaling the size of the channel estimation target region may be separately configured as the delay resource length and the Doppler resource length of the reference signal block, or may be configured as a combination of the delay resource length and the Doppler resource length of the reference signal block.

Meanwhile, the transmitter and receiver may predefine a location of the channel estimation target region 600 within the delay-Doppler resource grid (or location thereof within the reference signal block) and set it without separate signaling. Alternatively, the transmitter may select the location of the channel estimation target region 600 within the delay-Doppler resource grid (or location thereof within the reference signal block), and may set the location of the channel estimation target region 600 within the delay-Doppler resource grid (or location thereof within the reference signal block) to the receiver through signaling.

Conversely, the receiver may select the location of the channel estimation target region 600 within the delay-Doppler resource grid (or location thereof within the reference signal block), and set the location of the channel estimation target region 600 within the delay-Doppler resource grid (or location thereof within the reference signal block) to the transmitter through signaling.

Here, the location (or each of the locations) of the channel estimation target region 600 within the delay-Doppler resource grid may be indicated by a delay resource index and a Doppler resource index of a second resource element belonging to the channel estimation target region within the delay-Doppler resource grid. In addition, the location (or each of locations) of the channel estimation target region 600 within the reference signal block may be indicated by a delay resource index and a Doppler resource index of a second resource element belonging to the channel estimation target region within the delay-Doppler resource grid, which are defined within the reference signal block. In addition, it may be indicated by a delay resource offset and a Doppler resource offset of the second resource element belonging to the channel estimation target region from a fourth reference resource element within the delay-Doppler resource grid (or within the reference signal block).

Here, the first reference resource element may be a resource element with the lowest delay index and the lowest Doppler index within the delay-Doppler resource grid (or within the reference signal block). In addition, on which resource element (or resource elements) within the channel estimation target region (or reference signal block) the location (or each of locations) of the channel estimation target region within the delay-Doppler resource grid (or reference signal block) is defined based may be defined between the transmitter and receiver. For example, the location (or each of locations) within the delay-Doppler resource grid (or reference signal block) may be one of four vertices or a center point of the channel estimation target region.

Each of the four vertices may be a resource element corresponding to the lowest delay resource index (or start delay resource offset 521) and the lowest Doppler resource index (or start Doppler resource offset 522) of the channel estimation target region, a resource element corresponding to the highest delay resource index (or end delay resource offset) and the highest Doppler resource index (or end Doppler resource offset) of the channel estimation target region, a resource element corresponding to the lowest delay resource index (or start delay resource offset) and the highest Doppler resource index (or end Doppler resource offset) of the channel estimation target region, or a resource element corresponding to the highest delay resource index (or end delay resource offset) and the lowest Doppler resource index (or start Doppler resource offset) of the channel estimation target region. The center point is a resource element located at the center of the channel estimation target region.

The region to which the channel estimation target region 600 is allocated within the delay-Doppler resource grid may be configured by a combination of the location and the size of the channel estimation target region within the delay-Doppler resource grid (or within the reference signal block).

The region to which the channel estimation target region 600 is allocated within the delay-Doppler resource grid may be configured by a combination of third and fourth locations within the Doppler resource grid (or within the reference signal block). An example of a combination of the third location and the fourth location may include a combination of a location indicated by the start delay resource offset and the start Doppler resource offset and a location indicated by the end delay resource offset and the end Doppler resource offset. Another example of a combination of the third location and the fourth location may include a combination of a location indicated by the start delay resource offset and the end Doppler resource offset and a location indicated by the end delay resource offset and the start Doppler resource offset.

Meanwhile, the transmitter or receiver may configure the channel estimation target region 600 by including a resource element to which the first level reference signal is allocated in the channel estimation target region 600. In this case, the transmitter and receiver may define in advance that the second resource element is the same as the resource element to which the first level reference signal is allocated. In this case, only one among configuration information of the location of the second resource element within the delay-Doppler resource grid and a parameter on the location of the resource element to which the first level reference signal is allocated within the delay-Doppler resource grid (or within the reference signal block) may be included in signaling parameters.

The receiver may implementationally select the channel estimation target region 600. For this purpose, the receiver may consider configuration information for the reference signal block. Here, the configuration information for the reference signal block may be based on parameters related to the corresponding configuration, which are signaled by the receiver to the transmitter, or may be based on parameters related to the corresponding configuration, which are signaled by the transmitted to the receiver.

Figure 7:
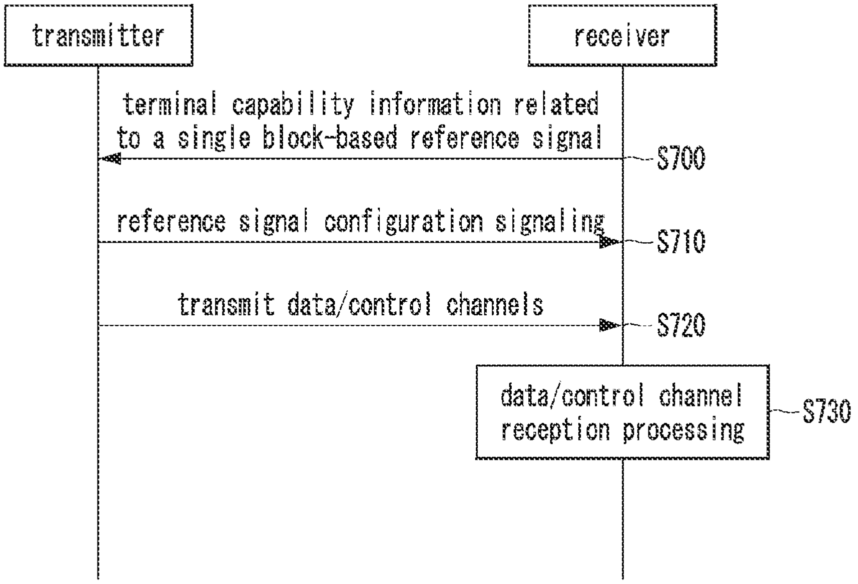
FIG. 7 is a sequence chart illustrating a first exemplary embodiment of a channel estimation method.

FIG. 7 is a sequence chart illustrating a first exemplary embodiment of a channel estimation method.

Referring to FIG. 7, a receiver may report terminal capability information related to a single block-based reference signal to a transmitter (S700). Here, the transmitter may be a base station and the receiver may be a terminal. The single block-based reference signal may be referred to as a block reference signal or a single block reference signal. The receiver may report terminal capability information to the transmitter indicating that the receiver has the capability to estimate a channel in the delay-Doppler domain using a single block-based reference signal. The transmitter may receive, from the receiver, the report on terminal capability information indicating that a channel in the delay-Doppler domain can be estimated using a single block-based reference signal. Accordingly, the transmitter may signal reference signal configuration information to the receiver (S710). Then, the receiver may receive the reference signal configuration information from the transmitter, and perform configuration related to the reference signal.

The reference signal configuration information may include information on the size of the reference signal block, information on the location of the reference signal block, information on the location of a non-zero power reference signal within the reference signal block, information on the power of the non-zero power reference signal within the reference signal block, information on generation of the non-zero power reference signal within the reference signal block, information on the size of the channel estimation target region, information on the location of the channel estimation target region, and/or the like.

Meanwhile, the transmitter may transmit the reference signal configuration information to the receiver through radio resource control (RRC) signaling. Alternatively, the transmitter may signal the reference signal configuration information to the receiver in a multi-stage form. In other words, the transmitter may define reference signal configuration parameter sets and transmit the defined reference signal configuration parameter sets to the receiver through RRC signaling. Then, the receiver may receive the reference signal configuration parameter sets from the transmitter, and store and manage them. Thereafter, the transmitter may signal to the receiver an identifier of a reference signal configuration parameter set to be activated through a MAC CE or DCI on a control channel. The receiver may receive the identifier of the reference signal configuration parameter set to be activated from the transmitter through the MAC CE or DCI on the control channel. The receiver may perform configuration related to a reference signal according to the identifier of the received reference signal configuration parameter set.

Meanwhile, the transmitter may signal reference signal configuration information for a unicast data channel to the receiver in a receiver-specific manner. The receiver may receive the reference signal configuration information from the transmitter through a receiver-specific limited resource. Accordingly, the receiver may perform configuration related to a reference signal according to the received reference signal configuration information. Alternatively, the transmitter may signal reference signal configuration information for a broadcast/multicast data channel to a receiver group (or receivers belonging to the receiver group) in a receiver group-specific manner. The receiver may receive the reference signal configuration information from the transmitter through a receiver group-specific limited resource. Accordingly, the receiver may perform configuration related to a reference signal according to the received reference signal configuration information.

Meanwhile, reference signal block-related configuration parameters may be common to delay-Doppler domain resource blocks (or delay-Doppler resource grids). Accordingly, the transmitter may configure the reference signal block-related configuration parameters to the receiver in common to delay-Doppler domain resource blocks (or delay-Doppler resource grids). Alternatively, the reference signal block-related configuration parameters may be different for each delay-Doppler domain resource block (or delay-Doppler resource grid). Accordingly, the transmitter may configure the reference signal block-related configuration parameters for each delay-Doppler domain resource block (or delay-Doppler resource grid) to the receiver.

Meanwhile, the transmitter may transmit a data/control channel including a single block-based reference signal to the receiver based on the reference signal configuration (S720). Then, the receiver may receive the data/control channel including the single block-based reference signal from the transmitter, and perform necessary processing (S730). In other words, the receiver may perform demodulation according to a transmission scheme (e.g., OTFS or MBS-MC) used for the received data/control channel, and then obtain the single block-based reference signal based on the reference signal configuration information. Then, the receiver may perform channel estimation using the obtained single block-based reference signal. Here, the channel estimation may be performed on the channel estimation target region. Additionally, the receiver may perform channel equalization and decoding based on the estimated channel.

Figure 8:
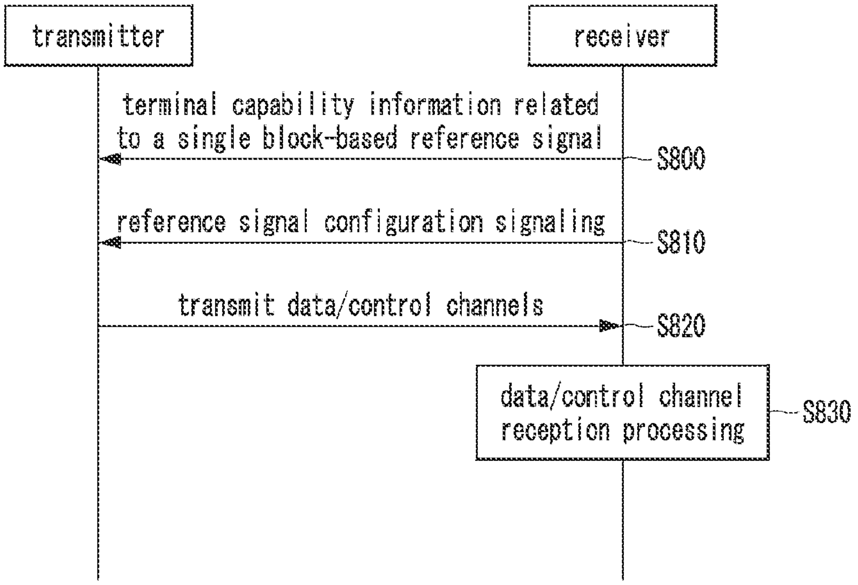
FIG. 8 is a sequence chart illustrating a second exemplary embodiment of a channel estimation method.

FIG. 8 is a sequence chart illustrating a second exemplary embodiment of a channel estimation method.

Referring to FIG. 8, a transmitter may report terminal capability information related to a single block-based reference signal to a receiver (S800). Here, the transmitter may be a terminal and the receiver may be a base station. The single block-based reference signal may be referred to as a block reference signal or a single block reference signal. The transmitter may report terminal capability information to the receiver indicating that the transmitter has the capability to estimate a channel in the delay-Doppler domain using a single block-based reference signal. The receiver may receive, from the transmitter, the report on terminal capability information indicating that a channel in the delay-Doppler domain can be estimated using a single block-based reference signal. Accordingly, the receiver may signal reference signal configuration information to the transmitter (S810). Then, the transmitter may receive the reference signal configuration information from the receiver, and perform configuration related to the reference signal.

The reference signal configuration information may include information on the size of the reference signal block, information on the location of the reference signal block, information on the location of a non-zero power reference signal within the reference signal block, information on the power of the non-zero power reference signal within the reference signal block, information on generation of the non-zero power reference signal within the reference signal block, information on the size of the channel estimation target region, information on the location of the channel estimation target region, and/or the like.

Meanwhile, the receiver may transmit the reference signal configuration information to the transmitter through RRC signaling. Alternatively, the receiver may signal the reference signal configuration information to the transmitter in a multi-stage form. In other words, the receiver may define reference signal configuration parameter sets and transmit the defined reference signal configuration parameter sets to the transmitter through RRC signaling. Then, the transmitter may receive the reference signal configuration parameter sets from the receiver, and store and manage them. Thereafter, the receiver may signal to the transmitter an identifier of a reference signal configuration parameter set to be activated through a MAC CE or DCI on a control channel. The transmitter may receive the identifier of the reference signal configuration parameter set to be activated from the receiver through the MAC CE or DCI on the control channel. The transmitter may perform configuration related to a reference signal according to the identifier of the received reference signal configuration parameter set.

Meanwhile, the receiver may signal reference signal configuration information for a unicast data channel to the transmitter in a transmitter-specific manner. The transmitter may receive the reference signal configuration information from the receiver through a transmitter-specific limited resource. Accordingly, the transmitter may perform configuration related to a reference signal according to the received reference signal configuration information. Alternatively, the receiver may signal reference signal configuration information for a broadcast/multicast data channel to a transmitter group (or transmitter belonging to the transmitter group) in a transmitter group-specific manner. The transmitter may receive the reference signal configuration information from the receiver through a transmitter group-specific limited resource. Accordingly, the transmitter may perform configuration related to a reference signal according to the received reference signal configuration information.

Meanwhile, reference signal block-related configuration parameters may be common to delay-Doppler domain resource blocks (or delay-Doppler resource grids). Accordingly, the receiver may configure the reference signal block-related configuration parameters to the transmitter in common to delay-Doppler domain resource blocks (or delay-Doppler resource grids). Alternatively, the reference signal block-related configuration parameters may be different for each delay-Doppler domain resource block (or delay-Doppler resource grid). Accordingly, the receiver may configure the reference signal block-related configuration parameters for each delay-Doppler domain resource block (or delay-Doppler resource grid) to the transmitter.

Meanwhile, the transmitter may transmit a data/control channel including a single block-based reference signal to the receiver based on the reference signal configuration (S820). Then, the receiver may receive the data/control channel including the single block-based reference signal from the transmitter, and perform necessary processing (S830). In other words, the receiver may perform demodulation according to a transmission scheme (e.g., OTFS or MBS-MC) used for the received data/control channel, and then obtain the single block-based reference signal based on the reference signal configuration information. Then, the receiver may perform channel estimation using the obtained single block-based reference signal. Here, the channel estimation may be performed on a channel estimation target region. Additionally, the receiver may perform channel equalization and decoding based on the estimated channel.

Figure 9:
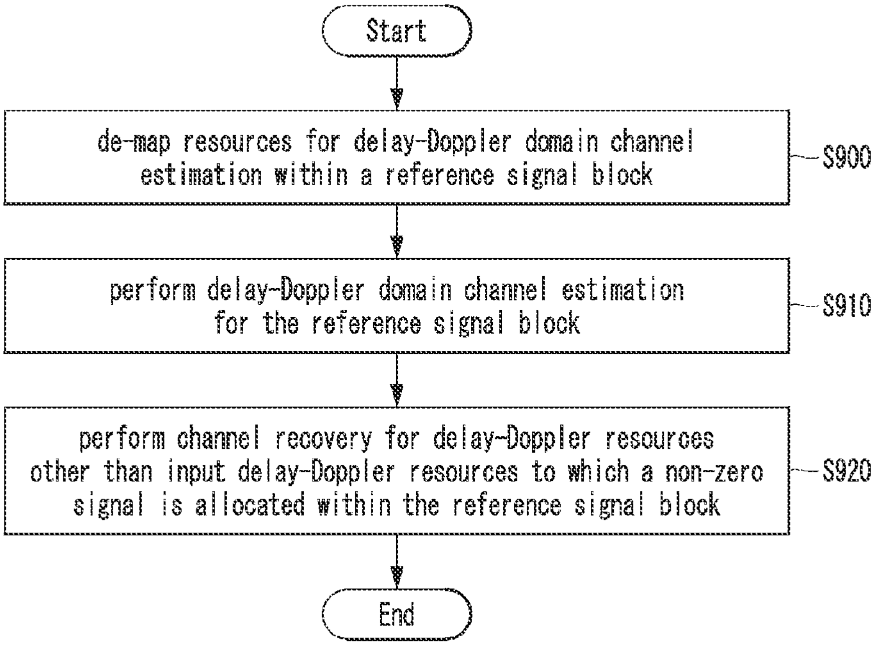
FIG. 9 is a conceptual diagram illustrating a first exemplary embodiment of the channel estimation and channel recovery process of FIG. 7.

FIG. 9 is a conceptual diagram illustrating a first exemplary embodiment of the channel estimation and channel recovery process of FIG. 7.

Referring to FIG. 9, the receiver may de-map delay-Doppler resources belonging to the channel estimation target region including a non-zero signal (or the above-described non-zero power reference signal) in the reference signal block in order to perform delay-Doppler domain channel estimation (S900). The de-mapped resources are resources belonging to the channel estimation target region among output delay-Doppler resources for input delay-Doppler resources of the non-zero signal in the reference signal block. The receiver may perform channel estimation on the de-mapped delay-Doppler resources (S910). Here, channels of the remaining output delay-Doppler resources that do not belong to the channel estimation target region may be regarded as 0. Then, the receiver may recover the channels of the remaining input delay-Doppler resources within the delay-Doppler resource grid by using the results of performing the channel estimation (S920).

In other words, the receiver may assume the input delay-Doppler resource including the non-zero signal in the reference signal block as the q-th delay-Doppler resource. Here, q may be a positive integer or a positive integer including zero. In addition, the receiver may perform de-mapping and channel estimation using Equation 18 on delay-Doppler resources belonging to the channel estimation target region that include non-zero signals in the reference signal block.

$$\begin{aligned}\hat{h}_q &= \alpha \cdot vec\left(\hat{M}_d \hat{M}_d^T \cdot vec^{-1}\left(\left[F_M^H F_M C_R R F_N\right]_q\right) \cdot \hat{M}_D^T \hat{M}_D\right) \\ &= \alpha \cdot \left(\left(\hat{M}_D^T \hat{M}_D\right) \otimes \left(\hat{M}_d \hat{M}_d^T\right)\right)\left[F_M^H F_M C_R R F_N\right]_q\end{aligned} \quad \text{[Equation 18]}$$

Here, $$\hat{M}_d^T$$

may be a channel estimation resource de-mapping matrix in the delay domain.

$$\hat{M}_D^T$$

may be a channel estimation resource de-mapping matrix in the Doppler domain. α may be equal to Equation 19 for least square channel estimation and equal to Equation 20 for minimum mean square error channel estimation.

$$\alpha = 1/\bar{x}_q \quad \text{[Equation 19]}$$

$$\alpha = \bar{x}_q^* / \left(|\bar{x}_q|^2 + n_0\right) \quad \text{[Equation 20]}$$

$\bar{x}_q$ may be a channel estimate of a signal or symbol allocated to the q-th delay-Doppler domain resource. $n_0$ may be a variance of a noise or an average noise power. q may be a one-dimensional input resource index of a signal or symbol for channel estimation in the delay-Doppler domain. The one-dimensional index of the q-th input delay-Doppler domain resource may correspond to the $(\lfloor (q-1)/M \rfloor + 1)$-th input Doppler resource and the $(((q-1) \bmod M)+1)$-th input delay resource of the estimation resource index starting from 1.

$[A]_q$ may be the q-th column of a matrix A. $vec^{-1}(a)$ may mean de-vectorization of a vector a, and $vec(vec^{-1}(a))$ may be a.

In Equation 18, if an absolute value of an element in $\hat{h}_q$ is equal to or less than (or less than) a predetermined value (e.g., a square root of the average noise power), the transmitter may additionally perform an operation of replacing the element with 0.

The receiver may assume input delay-Doppler resources within the delay-Doppler resource grid other than the input delay-Doppler resources to which non-zero signal(s) are allocated in the reference signal block as the q'(≠q)-th input delay-Doppler resource. In addition, the receiver may calculate a recovered channel $\hat{h}_{q'}$ that does not include phase correction for the input delay-Doppler resources within the delay-Doppler resource grid other than the input delay-Doppler resources to which non-zero signal(s) are allocated in the reference signal block by using Equation 21.

$$\hat{h}_{q'} = \left(\bar{\prod}_N^{q'_v - q_v} \otimes \bar{\prod}_M^{q'_\tau - q_\tau}\right)\hat{h}_q \text{ for } q' \neq q \quad \text{[Equation 21]}$$

Here, $i_\tau$ may be equal to Equation 22 below, and $i_v$ may be equal to Equation 23 below.

$$i_\tau = (i-1) \bmod M \quad \text{[Equation 22]}$$

$$i_v = \lfloor (i-1)/M \rfloor \quad \text{[Equation 23]}$$

Equation 21 may mean cyclic-shifting corresponding to a difference between an input delay-Doppler resource of the non-zero signal in the reference signal block and an input delay-Doppler resource that is a channel recovery target within the delay-Doppler resource grid excluding the input delay-Doppler resource of the non-zero signal in the reference signal block. In other words, Equation 21 may mean performing a cyclic shift equal to a difference in Doppler resources and a block cyclic shift equal to a difference in delay resources. A Doppler shift of a channel path may not be large. In other words, a channel change over time within each MC symbol may be insignificant. In this case, even if the receiver recovers the channel without phase correction, it may have a small channel estimation error.

Meanwhile, the receiver may calculate a recovered channel $\hat{h}_{q'}$ that includes phase restoration by using Equation 24 with respect to delay-Doppler resources other than input delay-Doppler resources to which non-zero signal(s) are allocated in the reference signal block.

$$\hat{h}_{q'} = \left(\bar{\prod}_N^{q'_v} \otimes \bar{\prod}_M^{q'_\tau}\right)\bar{\Delta}_{M,\bar{M}N,0}^{q'_\tau}\hat{h}_1 \quad \text{[Equation 24]}$$

Here, $\hat{h}_1$ may be equal to Equation 25.

$$\hat{h}_1 = \left(\bar{\prod}_N^{-q_v} \otimes \bar{\prod}_M^{-q_\tau}\right)\bar{\Delta}_{M,\bar{M}N,0}^{-q_\tau}\hat{h}_q \quad \text{[Equation 25]}$$

Through the above series of processes, the receiver may obtain a channel estimate for a data symbol region within the delay-Doppler resource grid by using the channel estimate obtained for the reference signal block. Here, the data symbol region refers to a region composed of resource elements to which data symbols are allocated within the delay-Doppler resource grid. The receiver may detect the data symbols based on the channel estimate for the data symbol region.

For the transmission scheme in which a plurality of delay-Doppler resource grids are configured in the delay-Doppler domain (e.g., MBS-MC described above), a reference signal block may be included for each delay-Doppler resource grid as described above. In this case, the above-described series of channel estimation processes may be performed for each delay-Doppler resource grid, and data symbols may be detected for each delay-Doppler resource grid using a channel estimate obtained for each delay-Doppler resource grid.

Meanwhile, if there is a fractional part in a delay and/or Doppler shift of a channel path, channel recovery performed after channel estimation using the above-described single block-based reference signal may not be ideally accurate. To solve or alleviate this problem, the present disclosure provides a method of configuring a reference signal based on multiple blocks.

A multi-block based reference signal may be composed of a plurality of single block reference signals. Here, the single block reference signal may follow the above-described configuration of the single block-based reference signal. In addition, the plurality of single block reference signals may be referred to as a block reference signal or a multi-block reference signal. The size of each reference signal block associated with a multi-block reference signal may be the same. In this case, the transmitter and receiver may define a common reference signal block size in advance and set it without separate signaling. Alternatively, the transmitter may select the common reference signal block size and set it to the receiver through signaling. Conversely, the receiver may select the common reference signal block size and set it to the transmitter through signaling.

On the other hand, reference signal blocks related to a multi-block reference signal may have different sizes. In this case, the transmitter and receiver may define a size for each reference signal block or reference signal block group in advance, and share it without separate signaling. Alternatively, the transmitter may set the size of each reference signal block or reference signal block group, and may set it to the receiver through signaling. Conversely, the receiver may set the size of each reference signal block or reference signal block group, and may set it to the transmitter through signaling.

A non-zero reference signal (or non-zero power reference signal) of each reference signal block may be equally limited. The non-zero reference signals of the respective reference signal blocks may use different signals. In this case, the transmitter and receiver may define the different signals in advance and set them without separate signaling. Alternatively, the transmitter may select the different signals and set them to the receiver through signaling. Conversely, the receiver may select the different signals and set them to the transmitter through signaling.

Delay-Doppler resources to which the respective reference signal blocks are allocated may not overlap with each other. In particular, to improve channel estimation/recovery performance, the respective reference signal blocks may be allocated at equal intervals across delay resources. In addition, the respective reference signal blocks may be allocated to Doppler resources, so that non-zero reference signals experiencing channels do not cause interference to delay-Doppler resources to which other reference signal blocks are allocated. The transmitter may not expect resources allocated to different reference signal blocks in the delay-Doppler grid configured by the receiver to overlap each other. The receiver may not expect resources allocated to different reference signal blocks in the delay-Doppler grid configured by the transmitter to overlap each other.

Meanwhile, the transmitter and receiver may define a location of each reference signal block in the delay-Doppler domain in advance (as a method for indicating the location, the same method as in the above-described case of single reference signal block is used), and set it without separate signaling. Alternatively, the transmitter may set the location of each reference signal block in the delay-Doppler domain, and set it to the receiver through signaling. Conversely, the receiver may set the location of each reference signal block in the delay-Doppler domain, and set it to the transmitter through signaling.

To reduce signaling overhead in configuring locations of a plurality of reference signal blocks in the delay-Doppler domain, the transmitter or receiver may define a representative (or reference) reference signal block among the plurality of reference signal blocks. In addition, the transmitter or receiver may provide the locations of the remaining reference signal blocks other than the representative reference signal block by using information on differences from the location of the representative reference signal block in the delay-Doppler domain (e.g., a difference in delay resource indices and a difference in Doppler indices). The location of each of the reference signal blocks in the delay-Doppler domain may be indicated based on a delay-Doppler resource index corresponding to one of four vertices or center point of the reference signal block, as in the case of the single reference signal block described above.

Meanwhile, as an example of defining the representative reference signal block above, a reference signal block with the lowest (or highest) delay resource index and the lowest (or highest) Doppler resource index indicating the location of the reference signal block may be defined as the representative reference signal block. Among the delay resource index and the Doppler resource index, the delay resource index (or Doppler resource index) may be considered preferentially.

When performing channel estimation based on the reference signal block at the receiver, the transmitter and receiver may define a channel estimation target region for each reference signal block or a common channel estimation target region in advance, and configure it without separate signaling. Alternatively, the transmitter may select a channel estimation target region for each reference signal block or a common channel estimation target region, and configure it to the receiver through signaling. The receiver may determine the channel estimation target region for each reference signal block or the common channel estimation target region. When signaling the channel estimation target region, configuration information therefore may include the number of upper and lower (or left and right) delay resources and the number of left and right (or upper and lower) Doppler resources based on the center (or center point) of the reference signal block.

Figure 10A:
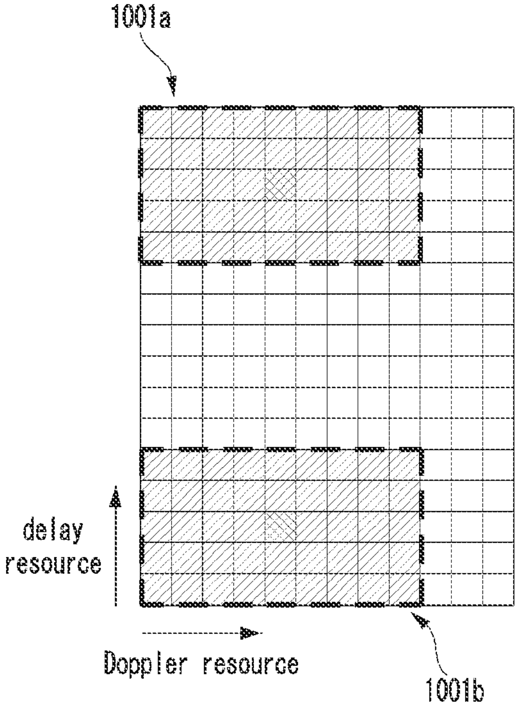
FIGS. 10A to 10C are conceptual diagrams illustrating a first exemplary embodiment of a multi-block-based reference signal.
Figure 10B:
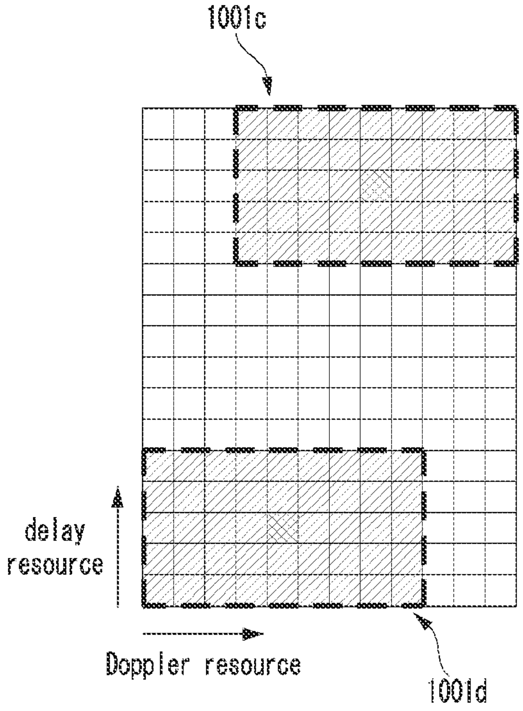
Figure 10C:
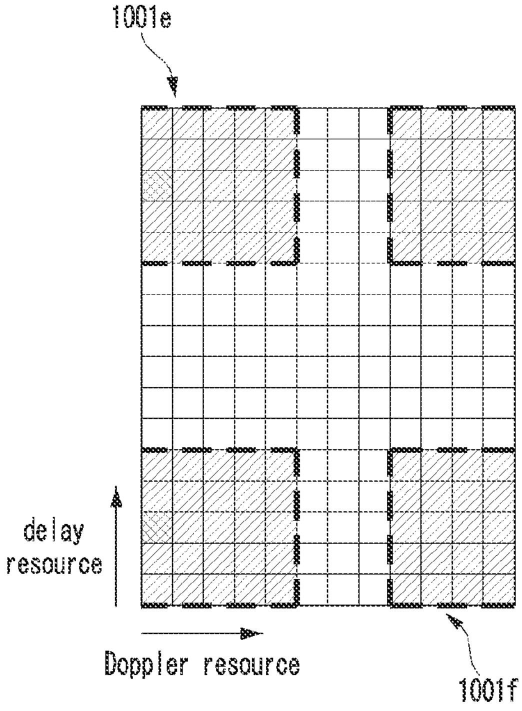

FIGS. 10A to 10C are conceptual diagrams illustrating a first exemplary embodiment of a multi-block-based reference signal.

Referring to FIG. 10A, a multi-block-based reference signal may be composed of a plurality of single block-based reference signals. In this case, each single block-based reference signal may be composed of a reference signal of a first level, which is allocated to one resource element (or, resource element group comprising a plurality of resource elements, hereinafter described as one resource element unless otherwise specified) for each reference signal block 1001*a* or 1001*b* within the delay-Doppler resource grid (or delay-Doppler domain resource block), and reference signals of a second level, which are allocated to the remaining resource elements. Here, the one resource element may be a central resource element of the reference signal block.

The multi-block based reference signal allocated to delay-Doppler resource(s) within the delay-Doppler resource grid may be allocated to a plurality of reference signal blocks 1001*a* and 1001*b*. The transmitter may configure the plurality of reference signal blocks 1001*a* and 1001*b*, which may have a predetermined size, to the delay-Doppler resources. The size of each of the reference signal blocks 1001*a* and 1001*b* may be defined by a Doppler resource length 1011*a* or 1011*b* and a delay resource length 1012*a* or 1012*b*. Here, the Doppler resource length 1011*a* or 1011*b* of the reference signal block may be defined as the number of Doppler resources on the Doppler axis, and the delay resource length 1012*a* or 1012*b* of the reference signal block may be defined as the number of delay resources on the delay axis. In addition, Doppler offsets of the first resource elements of the respective plurality of reference signal blocks 1001*a* and 1001*b* may be the same, and delay resource offsets of the first resource elements may be different. As described above, the reference signal blocks may be arranged to be furthest in the delay domain without overlapping each other.

Meanwhile, referring to FIG. 10B, a multi-block-based reference signal may be composed of a plurality of single block-based reference signals. In this case, each single block-based reference signal may be composed of a reference signal of a first level, which is allocated to one resource element for each reference signal block 1001*c* or 1001*d* within the delay-Doppler resource grid (or delay-Doppler domain resource block), and reference signals of a second level, which are allocated to the remaining resource elements. Here, the one resource element may be a central resource element of the reference signal block.

The multi-block based reference signal allocated on delay-Doppler resource(s) within the delay-Doppler resource grid may be allocated to a plurality of reference signal blocks 1001*c* and 1001*d*. The transmitter may configure the plurality of reference signal blocks 1001*c* and 1001*d*, which may have a predetermined size, to the delay-Doppler resources. The size of each of the reference signal blocks 1001*c* and 1001*d* may be defined by a Doppler resource length 1011*c* or 1011*d* and a delay resource length 1012*c* or 1012*d*. Here, the Doppler resource length 1011*c* or 1011*d* of the reference signal block may be defined as the number of Doppler resources on the Doppler axis, and the delay resource length 1012*c* or 1012*d* of the reference signal block may be defined as the number of delay resources on the delay axis. In addition, Doppler offsets of the first resource elements of the respective plurality of reference signal blocks 1001*c* and 1001*d* may be different, and delay resource offsets of the first resource elements may be different. As described above, the reference signal blocks may be arranged to be furthest in the delay domain and the Doppler domain without overlapping each other.

Meanwhile, referring to FIG. 10C, a multi-block-based reference signal may be composed of a plurality of single block-based reference signals. In this case, each single block-based reference signal may be composed of a reference signal of a first level, which is allocated to one resource element for each reference signal block 1001*e* or 1001*f* within the delay-Doppler resource grid (or delay-Doppler domain resource block), and reference signals of a second level, which are allocated to the remaining resource elements. Here, the one resource element may be a central resource element of the reference signal block.

The multi-block based reference signal allocated on delay-Doppler resource(s) within the delay-Doppler resource grid may be allocated to a plurality of reference signal blocks 1001*e* and 1001*f*. The transmitter may configure the plurality of reference signal blocks 1001*e* and 1001*f*, which may have a predetermined size, to the delay-Doppler resources. The size of each of the reference signal blocks 1001*e* and 1001*f* may be defined by a Doppler resource length 1011*e* or 1011*f* and a delay resource length 1012*e* or 1012*f*. Here, the Doppler resource length 1011*e* or 1011*f* of the reference signal block may be defined as the number of Doppler resources on the Doppler axis, and the delay resource length 1012*e* or 1012*f* of the reference signal block may be defined as the number of delay resources on the delay axis.

The reference signal blocks 1001*e* and 1001*f* may be circulated within the delay-Doppler domain resource block. Doppler offsets of the first resource elements of the respective plurality of reference signal blocks 1001*e* and 1001*f* may be the same, and delay resource offsets of the first resource elements may be different. As described above, the reference signal blocks may be arranged to be furthest in the delay domain and Doppler domain without overlapping each other.

Meanwhile, the transmitter and receiver may define the size of the reference signal blocks in advance and set it without separate signaling. Alternatively, the transmitter may select the size of the reference signal blocks and set it to the receiver through signaling. Conversely, the receiver may select the size of the reference signal blocks and set it to the transmitter through signaling. Parameter(s) for signaling the size of the reference signal blocks may be separately configured as a delay resource length and a Doppler resource length of the reference signal block, or may be configured as a combination of a delay resource length and a Doppler resource length of the reference signal block.

Meanwhile, the transmitter and receiver may define a location (or locations) of each reference signal block within the delay-Doppler resource grid and set it without separate signaling. Alternatively, the transmitter may select the location (or locations) of each reference signal block within the delay-Doppler resource grid and set it to the receiver through signaling. Conversely, the receiver may select the location (or locations) of each reference signal block within the delay-Doppler resource grid, and set it to the transmitter through signaling.

Here, the location (or each of the locations) of each reference signal block within the delay-Doppler resource grid may be indicated by a delay resource index and a Doppler resource index of a first resource element belonging to each reference signal block within the delay-Doppler resource grid. In addition, the location (or each of locations) of each reference signal block within the reference signal block may be indicated by a delay resource offset and a Doppler resource offset of the first resource element from a first reference resource element.

Here, the first reference resource element may be a resource element with the lowest delay index and lowest Doppler index within the delay-Doppler resource grid. In addition, on which resource element (or resource elements) within each reference signal block the location (or each of locations) of each reference signal block within the delay-Doppler resource grid is defined based may be defined between the transmitter and receiver. For example, the location (or each of locations) within the delay-Doppler resource grid (or reference signal block) may be one of four vertices or a center point of each reference signal block. Each of the four vertices may be a resource element corresponding to the lowest delay resource index (or start delay resource offset) and the lowest Doppler resource index (or start Doppler resource offset) of each reference signal block, a resource element corresponding to the highest delay resource index (or end delay resource offset) and the highest Doppler resource index (or end Doppler resource offset) of each reference signal block, a resource element corresponding to the lowest delay resource index (or start delay resource offset) and the highest Doppler resource index (or end Doppler resource offset) of each reference signal block, or a resource element corresponding to the highest delay resource index (or end delay resource offset) and the lowest Doppler resource index (or start Doppler resource offset) of each reference signal block. The center point is a resource element located at the center of each reference signal block.

The region to which each reference signal block is allocated within the delay-Doppler resource grid may be configured by a combination of the location and the size of the reference signal block within the delay-Doppler resource grid.

The region to which each reference signal block is allocated within the delay-Doppler resource grid may be configured by a combination of first and second locations within the Doppler resource grid. An example of a combination of the first location and the second location may include a combination of a location indicated by the start delay resource offset and the start Doppler resource offset and a location indicated by the end delay resource offset and the end Doppler resource offset. Another example of a combination of the first location and the second location may include a combination of a location indicated by the start delay resource offset and the end Doppler resource offset and a location indicated by the end delay resource offset and the start Doppler resource offset.

Meanwhile, the transmitter may allocate a reference signal (or symbol) with a first level of power (or magnitude) to the first resource element within each reference signal block, and allocate reference signals with a second level of power (or magnitude) to the remaining resources surrounding the first resource element. Here, the first level may be larger than the second level. As an example, the first level may have a non-zero power (or magnitude), and the second level may have a power (or magnitude) of 0. Here, a reference signal with non-zero power (or magnitude) may be referred to as a non-zero power reference signal. In addition, a reference signal with zero power (or magnitude) may be referred to as a zero power reference signal.

The transmitter and receiver may define the power (or magnitude) of the reference signal in advance and set it without separate signaling. Alternatively, the transmitter may select the power (or magnitude) of the reference signal and set it to the receiver through signaling. Conversely, the receiver may select the power (or magnitude) of the reference signal and set it to the transmitter through signaling. For zero power reference signals, information related to power (or magnitude) configuration may be excluded from signaling parameters. The signaling parameters regarding the power (or magnitude) of the reference signal may indicate a value of the power itself or a boosting level (or relative ratio or relative difference) compared to a power allocated to data symbols.

The transmitter and receiver may predefine the reference signal (or symbol, or a sequence when the reference signal is configured with multiple symbols) for each reference signal block (or common to reference signal blocks) or parameters related to its generation, and configure them without separate signaling. Alternatively, the transmitter may select the reference signal (or symbol, or a sequence when the reference signal is configured with multiple symbols) for each reference signal block (or common to reference signal blocks) or parameters related to its generation, and configure them to the receiver through signaling. Conversely, the receiver may select the reference signal (or symbol, or a sequence when the reference signal is configured with multiple symbols) for each reference signal block (or common to reference signal blocks) or parameters related to its generation, and configure them to the transmitter through signaling.

The location of the first level reference signal in each reference signal block within the delay-Doppler resource grid (or, in case of reference signals allocated to the first resource element group, a location of a second reference element in the first resource element group within the delay-Doppler resource grid) may be indicated by a delay resource offset and a Doppler resource offset of a resource element to which the first level reference signal is allocated (or, in case of reference signals allocated to the first resource element group, a second reference resource element in the first resource element group).

Here, the delay resource offset may be a difference in delay resources of the resource element to which the first level reference signal is allocated and a third reference resource element, and the Doppler resource offset may be a difference in Doppler resources of the resource element to which the first level reference signal is allocated and the third reference resource element. The third reference resource element may be one resource element in each reference signal block, and may be a resource element with the lowest delay resource index and Doppler resource index for each reference signal block.

In the latter case, the delay resource offset may correspond to a delay resource index defined within each reference signal block, and the Doppler resource offset may correspond to a Doppler resource index defined within each reference signal block. In case of reference signals allocated to the first resource element group, the region to which the reference signals are allocated may be indicated by the location of the first resource element group (or the location of the second reference resource element) and the size thereof. Here, the second reference resource element may be one resource element within the first resource element group, and may be a resource element located in the center within the first resource element group.

Figure 11A:
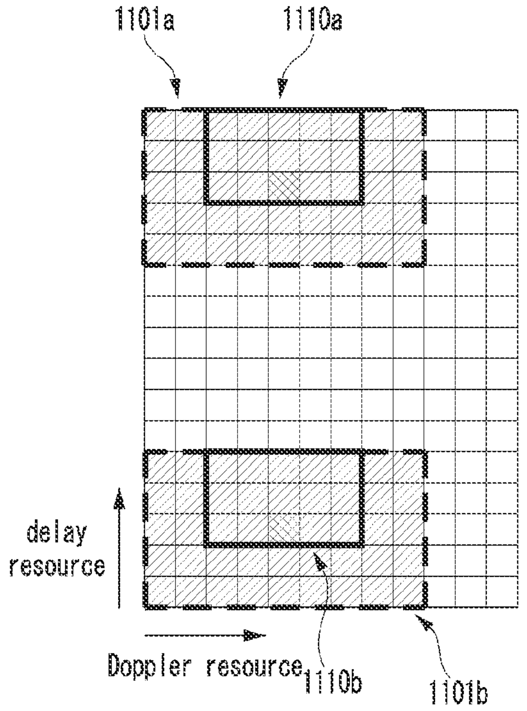
FIGS. 11A to 11C are conceptual diagrams illustrating a first exemplary embodiment of channel estimation target regions for a multi-block-based reference signal.
Figure 11B:
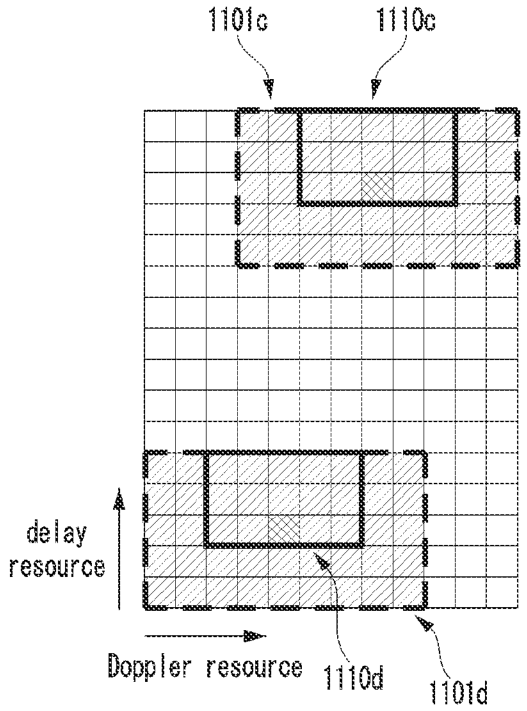
Figure 11C:
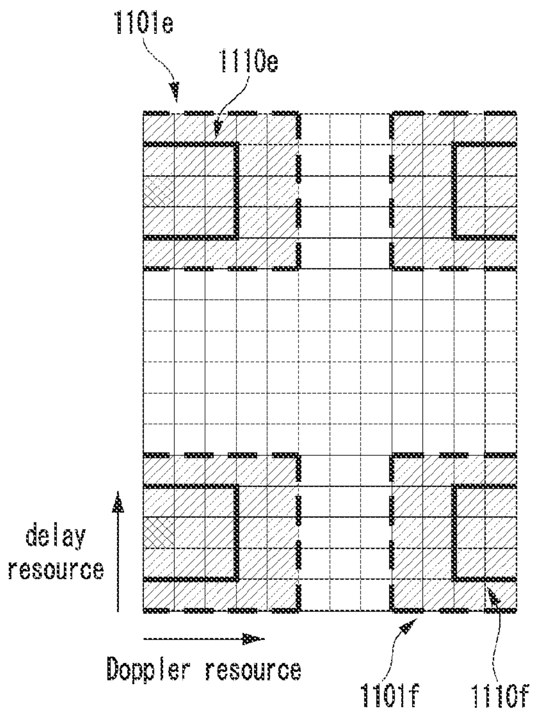

FIGS. 11A to 11C are conceptual diagrams illustrating a first exemplary embodiment of channel estimation target regions for a multi-block-based reference signal.

Referring to FIG. 11A, channel estimation target regions 1100*a* and 1100*b* may be respectively located in reference signal blocks 1101*a* and 1101*b*. Each of the channel estimation target regions 1100*a* and 1100*b* may have a block-type structure in delay-Doppler resource(s) within a delay-Doppler resource grid. The size of each of the channel estimation target regions may be defined by a Doppler resource length and a delay resource length. Here, the Doppler resource length of the channel estimation target region may be defined as the number of Doppler resources on the Doppler axis, and the delay resource length of the channel estimation target region may be defined as the number of delay resources on the delay axis. In addition, Doppler offsets of start points of the plurality of channel estimation target regions 1100*a* and 1100*b* may be the same, and delay resource offsets of the start points may be different.

Referring to FIG. 11B, channel estimation target regions 1100*c* and 1100*d* may be respectively located in reference signal blocks 1101*c* and 1101*d*. Each of the channel estimation target regions 1100*c* and 1100*d* may have a block-type structure in delay-Doppler resource(s) within a delay-Doppler resource grid. The size of each of the channel estimation target regions may be defined by a Doppler resource length and a delay resource length. Here, the Doppler resource length of the channel estimation target region may be defined as the number of Doppler resources on the Doppler axis, and the delay resource length of the channel estimation target region may be defined as the number of delay resources on the delay axis. In addition, Doppler offsets of start points of the plurality of channel estimation target regions 1100*c* and 1100*d* may be different, and delay resource offsets of the start points may be different.

Referring to FIG. 11C, channel estimation target regions 1100*e* and 1100*f* may be respectively located in reference signal blocks 1101*e* and 1101*f*. Each of the channel estimation target regions 1100*e* and 1100*f* may have a block-type structure in delay-Doppler resource(s) within a delay-Doppler resource grid. The size of each of the channel estimation target regions may be defined by a Doppler resource length and a delay resource length. Here, the Doppler resource length of the channel estimation target region may be defined as the number of Doppler resources on the Doppler axis, and the delay resource length of the channel estimation target region may be defined as the number of delay resources on the delay axis. In addition, the plurality of channel estimation target regions 1100*e* and 1100*f* may be circulated within a delay-Doppler domain resource block, Doppler offsets of start points thereof may be different, and delay resource offsets of the start points may be different.

Meanwhile, the transmitter and receiver may predefine the size of the channel estimation target region for each reference signal block (or common to reference signal blocks) and set it without separate signaling. Alternatively, the transmitter may select the size of the channel estimation target region for each reference signal block (or common to reference signal blocks) and set it to the receiver through signaling. Conversely, the receiver may select the size of the channel estimation target region for each reference signal block (or common to reference signal blocks) and set it to the transmitter through signaling. The parameter(s) for signaling the size of the channel estimation target region may be separately configured as the delay resource length and the Doppler resource length of the reference signal block, or may be configured as a combination of the delay resource length and the Doppler resource length of the reference signal block.

Meanwhile, the transmitter and receiver may predefine the location of the channel estimation target region for each reference signal block (or common to reference signal blocks) within the delay-Doppler resource grid (or within the reference signal block), and configure it without separate signaling. Alternatively, the transmitter may select the location of the channel estimation target region for each reference signal block (or common to reference signal blocks) within the delay-Doppler resource grid (or within the reference signal block), and configure the location of the channel estimation target region within the delay-Doppler resource grid to the receiver through signaling.

On the other hand, the receiver may select the location of the channel estimation target region for each reference signal block (or common to reference signal blocks) within the delay-Doppler resource grid, and configure the location of the channel estimation target region within the delay-Doppler resource grid to the transmitter through signaling. Here, the location (or each location) of the channel estimation target region(s) within the delay-Doppler resource grid may be indicated by a delay resource index and a Doppler resource index of a second resource element belonging to the channel estimation target region(s) within the delay-Doppler resource grid.

In addition, the location (or each of the locations) of the channel estimation target region(s) within the reference signal block may be indicated by a delay resource index and a Doppler resource index of a second resource element belonging to the channel estimation target region within the delay-Doppler resource grid, which are defined within the reference signal block. In addition, it may be indicated by a delay resource offset and a Doppler resource offset of the second resource element from a fourth resource element. Here, the fourth reference resource element may be a resource element with the lowest delay index and lowest Doppler index within the delay-Doppler resource grid (or within the reference signal block).

In addition, on which resource element (or resource elements) within the channel estimation target region (or reference signal block) the location (or each of locations) within the delay-Doppler resource grid (or reference signal block) is defined based may be defined between the transmitter and receiver. For example, the location (or each of locations) within the delay-Doppler resource grid (or reference signal block) may be one of four vertices or a center point of the channel estimation target region.

Each of the four vertices may be a resource element corresponding to the lowest delay resource index (or start delay resource offset 521) and the lowest Doppler resource index (or start Doppler resource offset 522) of the channel estimation target region, a resource element corresponding to the highest delay resource index (or end delay resource offset) and the highest Doppler resource index (or end Doppler resource offset) of the channel estimation target region, a resource element corresponding to the lowest delay resource index (or start delay resource offset) and the highest Doppler resource index (or end Doppler resource offset) of the channel estimation target region, or a resource element corresponding to the highest delay resource index (or end delay resource offset) and the lowest Doppler resource index (or start Doppler resource offset) of the channel estimation target region. The center point is a resource element located at the center of the channel estimation target region.

The region to which the channel estimation target region is allocated within the delay-Doppler resource grid may be configured by a combination of the location and the size of the channel estimation target region within the delay-Doppler resource grid (or within the reference signal block). This may be configured for each reference signal block or configured to be common to reference signal blocks.

The region to which the channel estimation target region is allocated within the delay-Doppler resource grid may be configured by a combination of third and fourth locations within the Doppler resource grid (or within the reference signal block). An example of a combination of the third location and the fourth location may include a combination of a location indicated by the start delay resource offset and the start Doppler resource offset and a location indicated by the end delay resource offset and the end Doppler resource offset. Another example of a combination of the third location and the fourth location may include a combination of a location indicated by the start delay resource offset and the end Doppler resource offset and a location indicated by the end delay resource offset and the start Doppler resource offset. This may be configured for each reference signal block or configured to be common to reference signal blocks.

Meanwhile, the transmitter or receiver may configure the channel estimation target region within the reference signal block by including a resource element to which the first level reference signal is allocated in the corresponding reference signal block. In this case, the transmitter and receiver may define in advance that the second resource element is the same as the resource element to which the first level reference signal is allocated. In this case, only one among configuration information of the location of the second resource element within the delay-Doppler resource grid and a parameter on the location of the resource element to which the first level reference signal is allocated within the delay-Doppler resource grid (or within the reference signal block) may be included in signaling parameters.

The receiver may implementationally select the channel estimation target region for each reference signal block. For this purpose, the receiver may consider configuration information for the reference signal block. Here, the configuration information for the reference signal block may be based on parameters related to the corresponding configuration, which are signaled by the receiver to the transmitter, or may be based on parameters related to the corresponding configuration, which are signaled by the transmitted to the receiver.

Figure 12:
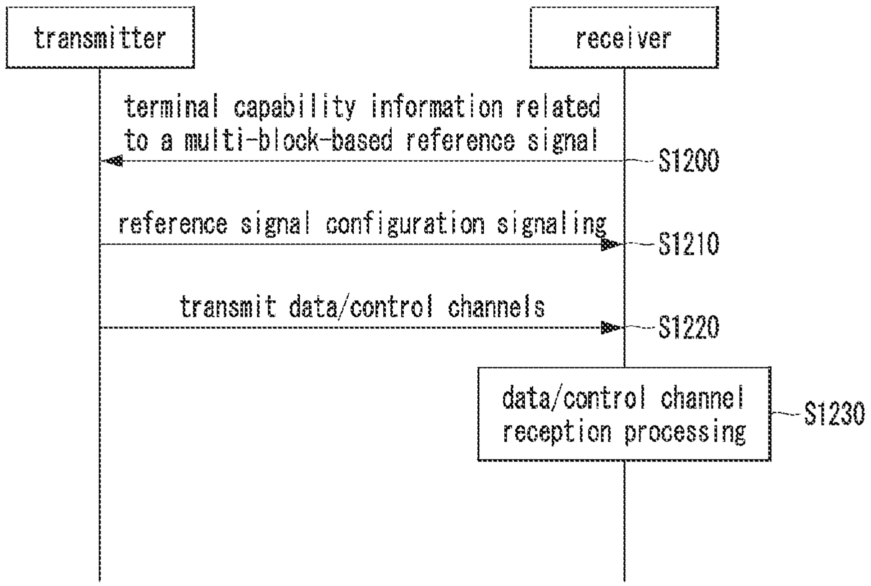
FIG. 12 is a sequence chart illustrating a third exemplary embodiment of a channel estimation method.

FIG. 12 is a sequence chart illustrating a third exemplary embodiment of a channel estimation method.

Referring to FIG. 12, a receiver may report terminal capability information related to a multi-block-based reference signal to a transmitter (S1200). Here, the transmitter may be a base station and the receiver may be a terminal. The multi-block-based reference signal may be referred to as a block reference signal or a multi-block reference signal. The receiver may report terminal capability information to the transmitter indicating that the receiver has the capability to estimate a channel in the delay-Doppler domain using a multi-block-based reference signal. The transmitter may receive, from the receiver, the report on terminal capability information indicating that a channel in the delay-Doppler domain can be estimated using a multi-block-based reference signal. Accordingly, the transmitter may signal reference signal configuration information to the receiver (S1210). Then, the receiver may receive the reference signal configuration information from the transmitter, and perform configuration related to the multi-block-based reference signal.

The reference signal configuration information may include information on the size of the reference signal block, information on the location of the reference signal block, information on the location of a non-zero power reference signal within the reference signal block, information on the power of the non-zero power reference signal within the reference signal block, information on generation of the non-zero power reference signal within the reference signal block, information on the size of the channel estimation target regions, information on the location of the channel estimation target regions, and/or the like.

Meanwhile, the transmitter may transmit the reference signal configuration information to the receiver through RRC signaling. Alternatively, the transmitter may signal the reference signal configuration information to the receiver in a multi-stage form. In other words, the transmitter may define reference signal configuration parameter sets and transmit the defined reference signal configuration parameter sets to the receiver through RRC signaling. Then, the receiver may receive the reference signal configuration parameter sets from the transmitter, and store and manage them. Thereafter, the transmitter may signal to the receiver an identifier of a reference signal configuration parameter set to be activated through a MAC CE or DCI on a control channel. The receiver may receive the identifier of the reference signal configuration parameter set to be activated from the transmitter through the MAC CE or DCI on the control channel. The receiver may perform configuration related to a reference signal according to the identifier of the received reference signal configuration parameter set.

Meanwhile, the transmitter may signal reference signal configuration information for a unicast data channel to the receiver in a receiver-specific manner. The receiver may receive the reference signal configuration information from the transmitter through a receiver-specific limited resource. Accordingly, the receiver may perform configuration related to a multi-block-based reference signal according to the received reference signal configuration information. Alternatively, the transmitter may signal reference signal configuration information for a broadcast/multicast data channel to a receiver group (or receivers belonging to the receiver group) in a receiver group-specific manner. The receiver may receive the reference signal configuration information from the transmitter through a receiver group-specific limited resource. Accordingly, the receiver may perform configuration related to a multi-block-based reference signal according to the received reference signal configuration information.

Meanwhile, reference signal block-related configuration parameters may be common to delay-Doppler domain resource blocks (or delay-Doppler resource grids). Accordingly, the transmitter may configure the reference signal block-related configuration parameters to the receiver in common to delay-Doppler domain resource blocks (or delay-Doppler resource grids). Alternatively, the reference signal block-related configuration parameters may be different for each delay-Doppler domain resource block (or delay-Doppler resource grid). Accordingly, the transmitter may configure the reference signal block-related configuration parameters for each delay-Doppler domain resource block (or delay-Doppler resource grid) to the receiver.

Meanwhile, the transmitter may transmit a data/control channel including a multi-block-based reference signal to the receiver based on the reference signal configuration (S1220). Then, the receiver may receive the data/control channel including the multi-block-based reference signal from the transmitter, and perform necessary processing (S1230). In other words, the receiver may perform demodulation according to a transmission scheme (e.g., OTFS or MBS-MC) used for the received data/control channel, and then obtain the multi-block-based reference signal based on the reference signal configuration information. Then, the receiver may perform channel estimation using the obtained multi-block-based reference signal. Here, the channel estimation may be performed on a channel estimation target region. Additionally, the receiver may perform channel equalization and decoding based on the estimated channel.

Figure 13:
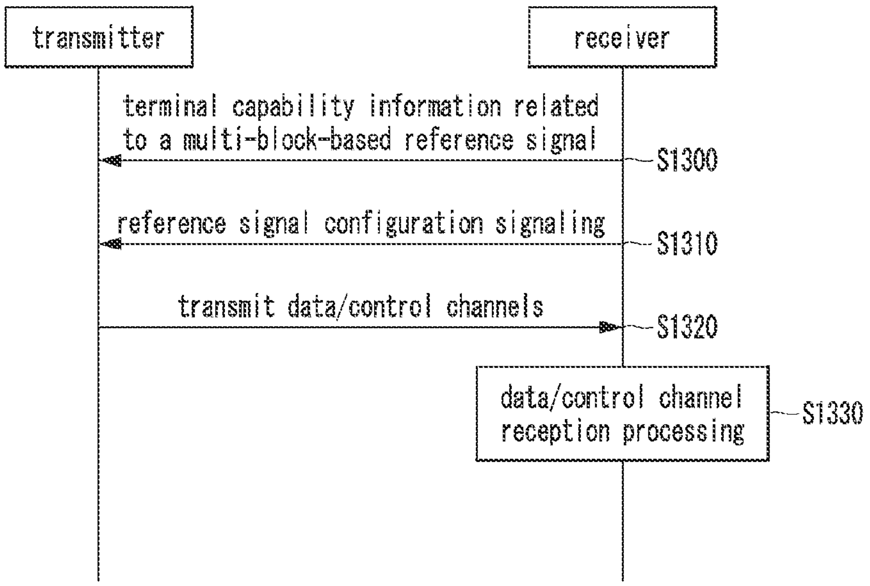
FIG. 13 is a sequence chart illustrating a fourth exemplary embodiment of a channel estimation method.

FIG. 13 is a sequence chart illustrating a fourth exemplary embodiment of a channel estimation method.

Referring to FIG. 13, a transmitter may report terminal capability information related to a multi-block-based reference signal to a receiver (S1300). Here, the transmitter may be a terminal and the receiver may be a base station. The multi-block-based reference signal may be referred to as a block reference signal or a multi-block reference signal. The transmitter may report terminal capability information to the receiver indicating that the transmitter has the capability to estimate a channel in the delay-Doppler domain using a multi-block-based reference signal. The receiver may receive, from the transmitter, the report on terminal capability information indicating that a channel in the delay-Doppler domain can be estimated using a multi-block-based reference signal. Accordingly, the receiver may signal reference signal configuration information to the transmitter (S1310). Then, the transmitter may receive the reference signal configuration information from the receiver, and perform configuration related to the multi-block-based reference signal.

The reference signal configuration information may include information on the size of the reference signal block, information on the location of the reference signal block, information on the location of a non-zero power reference signal within the reference signal block, information on the power of the non-zero power reference signal within the reference signal block, information on generation of the non-zero power reference signal within the reference signal block, information on the size of the channel estimation target regions, information on the location of the channel estimation target regions, and/or the like.

Meanwhile, the receiver may transmit the reference signal configuration information to the transmitter through RRC signaling. Alternatively, the receiver may signal the reference signal configuration information to the transmitter in a multi-stage form. In other words, the receiver may define reference signal configuration parameter sets and transmit the defined reference signal configuration parameter sets to the transmitter through RRC signaling. Then, the transmitter may receive the reference signal configuration parameter sets from the receiver, and store and manage them. Thereafter, the receiver may signal to the transmitter an identifier of a reference signal configuration parameter set to be activated through a MAC CE or DCI on a control channel. The transmitter may receive the identifier of the reference signal configuration parameter set to be activated from the receiver through the MAC CE or DCI on the control channel. The transmitter may perform configuration related to a reference signal according to the identifier of the received reference signal configuration parameter set.

Meanwhile, the receiver may signal reference signal configuration information for a unicast data channel to the transmitter in a transmitter-specific manner. The transmitter may receive the reference signal configuration information from the receiver through a transmitter-specific limited resource. Accordingly, the transmitter may perform configuration related to a reference signal according to the received reference signal configuration information. Alternatively, the receiver may signal reference signal configuration information for a broadcast/multicast data channel to a transmitter group (or transmitter belonging to the transmitter group) in a transmitter group-specific manner. The transmitter may receive the reference signal configuration information from the receiver through a transmitter group-specific limited resource. Accordingly, the transmitter may perform configuration related to a reference signal according to the received reference signal configuration information.

Meanwhile, reference signal block-related configuration parameters may be common to delay-Doppler domain resource blocks (or delay-Doppler resource grids). Accordingly, the receiver may configure the reference signal block-related configuration parameters to the transmitter in common to delay-Doppler domain resource blocks (or delay-Doppler resource grids). Alternatively, the reference signal block-related configuration parameters may be different for each delay-Doppler domain resource block (or delay-Doppler resource grid). Accordingly, the receiver may configure the reference signal block-related configuration parameters for each delay-Doppler domain resource block (or delay-Doppler resource grid) to the transmitter.

Meanwhile, the transmitter may transmit a data/control channel including a multi-block-based reference signal to the receiver based on the reference signal configuration (S1320). Then, the receiver may receive the data/control channel including the multi-block-based reference signal from the transmitter, and perform necessary processing (S1330). In other words, the receiver may perform demodulation according to a transmission scheme (e.g., OTFS or MBS-MC) used for the received data/control channel, and then obtain the multi-block-based reference signal based on the reference signal configuration information. Then, the receiver may perform channel estimation using the obtained multi-block-based reference signal. Here, the channel estimation may be performed on a channel estimation target region. Additionally, the receiver may perform channel equalization and decoding based on the estimated channel.

Figure 14:
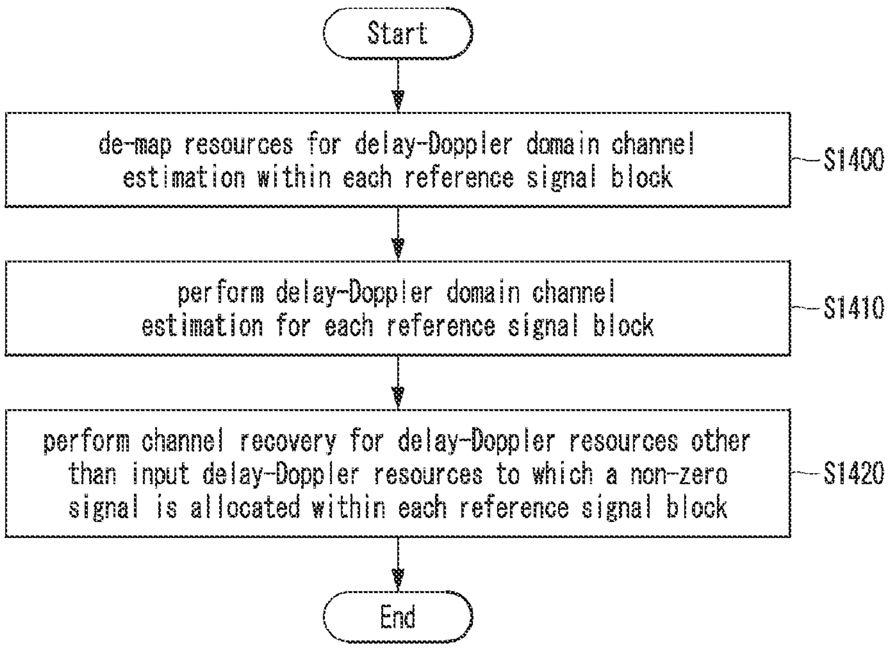
FIG. 14 is a conceptual diagram illustrating a first exemplary embodiment of the channel estimation and channel recovery process of FIG. 12.

FIG. 14 is a conceptual diagram illustrating a first exemplary embodiment of the channel estimation and channel recovery process of FIG. 12.

Referring to FIG. 14, the receiver may de-map input delay-Doppler resources belonging to a channel estimation target region including a non-zero signal (or the above-described non-zero power reference signal) for each reference signal block existing within a multi-block-based reference signal in order to perform delay-Doppler domain channel estimation (S1400). The de-mapped resources may be resources belonging to the channel estimation target region among output delay-Doppler resources for input delay-Doppler resources of the non-zero signal in the reference signal block. The receiver may perform channel estimation on the de-mapped delay-Doppler resources (S1410). Here, channels of the remaining output delay-Doppler resources that do not belong to the channel estimation target region may be regarded as 0. Then, the receiver may recover the channels of the remaining input delay-Doppler resources within the delay-Doppler resource grid by using the results of performing the channel estimation (S1420).

In other words, the receiver may perform channel estimation on the input delay-Doppler resource including the non-zero signal in the reference signal block. In addition, the receiver may recover the channels of the remaining input delay-Doppler resources based on results of performing the channel estimation.

In this case, the receiver may perform channel estimation on the input delay-Doppler resource including the non-zero signal in the reference signal block for each reference signal block, identically to the channel estimation method for the above-described single block-based reference signal. The receiver may assume the input delay-Doppler resources other than the input delay-Doppler resource including the non-zero signal in each reference signal block within the delay-Doppler resource grid as the q'($\notin S_{NZ}$)-th input delay-Doppler resource. Here, $S_{NZ}$ may indicate the input delay-Doppler resources to which non-zero signals of each reference signal block are allocated in the multi-block-based reference signal. The receiver may recover channels for the q'($\notin S_{NZ}$)-th input delay-Doppler resources, which are the input delay-Doppler resources other than the input delay-Doppler resource including the non-zero signal within the delay-Doppler resource grid in each reference signal block, by using Equation 26 below.

$$\hat{h}_{q'} = \sum_{q \in S_{NZ}} w_{q',q} \cdot \left( \bar{\prod}_N^{q'_\nu} \otimes \bar{\prod}_M^{q'_\tau} \right) \bar{\Delta}_{M,\bar{M}N,0}^{q'_\tau} \left( \bar{\prod}_N^{-q_\nu} \otimes \bar{\prod}_M^{-q_\tau} \right) \bar{\Delta}_{M,\bar{M}N,0}^{-q_\tau} \hat{h}_q \quad \text{[Equation 26]}$$

Here, $w_{q',q}$ may be a weight for delay-Doppler domain channel recovery of the q'-th input delay-Doppler resource from the delay-Doppler domain of the q'-th input support-Doppler resource.

Equation 26 may be an equation of performing row rearrangement for each channel estimate of the input delay-Doppler resource including non-zero signal in each reference signal block to input delay-Doppler resources of an estimation target channel together with phase correction, and obtaining a linear combination thereof. Weight values for the linear combination may be set differently depending on a filtering or interpolation scheme. Here, the receiver can perform restoration through non-linear operation instead of linear combination. In the case where phase correction is not performed in Equation 26, restoration can be performed as in Equation 27.

$$\hat{h}_{q'} = \sum_{q \in S_{NZ}} w_{q',q} \cdot \left( \bar{\prod}_N^{q'_\nu - q_\nu} \otimes \bar{\prod}_M^{q'_\tau - q_\tau} \right) \hat{h}_q \quad \text{[Equation 27]}$$

Through the above series of processes, the receiver may obtain a channel estimate for a data symbol region within the delay-Doppler resource grid by using the channel estimates obtained for the reference signal blocks. Here, the data symbol region refers to a region composed of resource elements to which data symbols are allocated within the delay-Doppler resource grid. The receiver may detect the data symbols based on the channel estimate for the data symbol region.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM, or flash memory. The program command may include not only machine language codes created by a compiler but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer, or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:

receiving configuration information of a block reference signal from a base station;

receiving a modulated data channel including the block reference signal according to the configuration information; and demodulating the block reference signal in the received data channel to estimate a channel for resources in a two-dimensional domain, to which the block reference signal is allocated, wherein the configuration information of the block reference signal includes at least one of information on a size of a reference signal block in the two-dimensional domain to which the block reference signal is allocated, information on a region to which the reference signal block is allocated, information on a location of a first reference resource to which a first reference signal at a first power level is allocated in the reference signal block, information on generation of the first reference signal, or information on the first power level.

2. The method according to claim 1, wherein the block reference signal includes the first reference signal at the first power level, which is allocated to at least one resource of the reference signal block configured in the two-dimensional domain, and second reference signals at a second power level, which are allocated to remaining resources of the reference signal block, and the first power level is greater than the second power level.

3. The method according to claim 2, wherein the first power level is a boosting level that is not zero compared to a power allocated to data symbols in a data symbol region of the two-dimensional domain, and the second power level is a boosting level that is zero compared to the power allocated to the data symbols in the data symbol region of the two-dimensional domain.

4. The method according to claim 1, wherein the information on the region to which the reference signal block is allocated includes at least one of information on a location of the first reference resource of the reference signal block and a size of the reference signal block, or information on the location of the first reference resource and a location of a second reference resource of the reference signal block.

5. The method according to claim 1, wherein the information on the location of the first reference resource to which the first reference signal is allocated is configured as information on a first domain resource offset and a second domain resource offset of the first reference resource in the two-dimensional domain, or information on a first domain resource index and a second domain resource index of the first reference resource in the two-dimensional domain.

6. The method according to claim 1, wherein the configuration information of the block reference signal is received from the base station through at least one of radio resource control (RRC), medium access control (MAC) control element (CE), or downlink control information (DCI) signaling.

7. The method according to claim 1, wherein the block reference signal includes the first reference signal at the first power level, which is allocated to at least one resource of each of a plurality of reference signal blocks configured in the two-dimensional domain, and second reference signals at a second power level, which are allocated to remaining resources of the each of the plurality of reference signal blocks, and the first power level is greater than the second power level.

8. The method according to claim 7, wherein the plurality of reference signal blocks do not overlap each other.

9. The method according to claim 1, wherein the demodulating of the block reference signal in the received data channel to estimate the channel for resources in the two-dimensional domain to which the block reference signal is allocated comprises:

demodulating the block reference signal in the received data channel to estimate a channel for the first reference resource of the block reference signal in the two-dimensional domain, to which the first reference signal at the first power level is allocated; and estimating or recovering channels for remaining resources in the two-dimensional domain by using a channel estimation result for the first reference resource in the two-dimensional domain, wherein resources in the two-dimensional domain, to which the block reference signal is allocated, include the first reference resource in the two-dimensional domain and a second reference resource in the two-dimensional domain, to which a second reference signal at a second power level is allocated, and the first power level is greater than the second power level.

10. The method according to claim 1, wherein the configuration information of the block reference signal includes information on a channel estimation region in the resources to which the block reference signal is allocated, and the demodulating of the block reference signal in the received data channel to estimate the channel for resources in the two-dimensional domain to which the block reference signal is allocated comprises:

demodulating the block reference signal in the received data channel to estimate a channel for resources in the channel estimation region, which include the first reference signal of the block reference signal at the first power level; and estimating or recovering channels for remaining resources excluding the first reference resource in the two-dimensional domain by using a channel estimation result for the resources in the channel estimation region, wherein the channel estimation region includes the first reference resource in the two-dimensional domain and a part of second reference resources in the two-dimensional domain, to which a second reference signal of the block reference signal at a second power level is allocated, and the first power level is greater than the second power level.

11. The method according to claim 1, further comprising:

estimating a channel for a data symbol region using channel estimation for the resources to which the block reference signal is allocated; and detecting data in the data channel using the channel estimated for the data symbol region.

12. A method of a base station, comprising:

transmitting configuration information of a block reference signal to a terminal; and transmitting a modulated data channel including the block reference signal according to the configuration information to the terminal, wherein the configuration information of the block reference signal includes at least one of information on a size of a reference signal block in the two-dimensional domain to which the block reference signal is allocated, information on a region to which the reference signal block is allocated, information on a location of a first reference resource to which a first reference signal at a first power level is allocated in the reference signal block, information on generation of the first reference signal, or information on the first power level.

13. The method according to claim 12, wherein the configuration information of the block reference signal is transmitted to the terminal through at least one of radio resource control (RRC), medium access control (MAC) control element (CE), or downlink control information (DCI) signaling.

14. The method according to claim 12, wherein the block reference signal includes the first reference signal at the first power level, which is allocated to at least one resource of the reference signal block configured in the two-dimensional domain, and second reference signals at a second power level, which are allocated to remaining resources of the reference signal block, and the first power level is greater than the second power level.

15. A terminal comprising a processor, wherein the processor causes the terminal to perform:

receiving configuration information of a block reference signal from a base station;

receiving a modulated data channel including the block reference signal according to the configuration information; and demodulating the block reference signal in the received data channel to estimate a channel for resources in a two-dimensional domain, to which the block reference signal is allocated, wherein the configuration information of the block reference signal includes at least one of information on a size of a reference signal block in the two-dimensional domain to which the block reference signal is allocated, information on a region to which the reference signal block is allocated, information on a location of a first reference resource to which a first reference signal at a first power level is allocated in the reference signal block, information on generation of the first reference signal, or information on the first power level.

16. The terminal according to claim 15, wherein the block reference signal includes the first reference signal at the first power level, which is allocated to at least one resource of athe-reference signal block configured in the two-dimensional domain, and second reference signals at a second power level, which are allocated to remaining resources of the reference signal block, and the first power level is greater than the second power level.

17. The terminal according to claim 15, wherein in the demodulating of the block reference signal in the received data channel to estimate the channel for resources in the two-dimensional domain to which the block reference signal is allocated, the processor further causes the terminal to perform:

demodulating the block reference signal in the received data channel to estimate a channel for the first reference resource of the block reference signal in the two-dimensional domain, to which the first reference signal at the first power level is allocated; and estimating or recovering channels for remaining resources in the two-dimensional domain by using a channel estimation result for the first reference resource in the two-dimensional domain;

wherein resources in the two-dimensional domain, to which the block reference signal is allocated, include the first reference resource in the two-dimensional domain and a second reference resource in the two-dimensional domain, to which a second reference signal at a second power level is allocated, and the first power level is greater than the second power level.

18. The terminal according to claim 15, wherein the processor further causes the terminal to perform:

estimating a channel for a data symbol region using channel estimation for the resources to which the block reference signal is allocated; and detecting data in the data channel using the channel estimated for the data symbol region.

19. The method according to claim 12, wherein the information on the region to which the reference signal block is allocated includes at least one of information on a location of the first reference resource of the reference signal block and a size of the reference signal block, or information on the location of the first reference resource and a location of a second reference resource of the reference signal block.

* * * * *